US012453838B2

United States Patent
Aklog et al.

(10) Patent No.: US 12,453,838 B2
(45) Date of Patent: Oct. 28, 2025

(54) CATHETER DEVICE SYSTEM AND METHOD OF USE

(71) Applicant: PAVmed Inc., New York, NY (US)

(72) Inventors: Lishan Aklog, Purchase, NY (US); Michael Boutillette, San Francisco, CA (US); Brian deGuzman, Paradise Valley, AZ (US); Gregory Eberl, Concord, MA (US); Shaun O'Neil, Cardiff, CA (US); Dennis Siedlak, Willoughby Hills, OH (US); Richard Yazbeck, Norwell, MA (US)

( * ) Notice: Subject to any disclaimer, the term of this patent is extended or adjusted under 35 U.S.C. 154(b) by 0 days.

(21) Appl. No.: 16/875,377

(22) Filed: May 15, 2020

(65) Prior Publication Data

US 2020/0360667 A1    Nov. 19, 2020

Related U.S. Application Data

(60) Provisional application No. 62/849,503, filed on May 17, 2019.

(51) Int. Cl.
*A61M 25/01* (2006.01)
*A61M 1/00* (2006.01)
(Continued)

(52) U.S. Cl.
CPC .... *A61M 25/0147* (2013.01); *A61M 25/0102* (2013.01); *A61M 25/0105* (2013.01);
(Continued)

(58) Field of Classification Search
CPC .......... A61M 25/0147; A61M 25/0102; A61M 25/0105; A61M 25/0133; A61M 25/0144;
(Continued)

(56) References Cited

U.S. PATENT DOCUMENTS 3,470,876 A * 10/1969 Barchilon ......... A61M 25/0147
604/95.04
4,617,015 A * 10/1986 Foltz ............... A61M 25/10186
604/920

(Continued)

FOREIGN PATENT DOCUMENTS

EP    1857038    11/2007
EP    3284502    2/2018
(Continued)

OTHER PUBLICATIONS

International Search Report in International Patent Application No. PCT/US2020/033183, mailed Aug. 12, 2020 (2 pages).

(Continued)

*Primary Examiner* — Bhisma R Mehta
*Assistant Examiner* — Mark A Igel

(57) ABSTRACT

The present invention relates to a catheter construction and method of use suitable for use in navigating within a body lumen or vessel, such as a vein, artery, nasal cavity, esophagus, etc. to assist in the performance of various procedures. The device can include a flexible tubular member having a proximal end, a distal end, and channel extending substantially between the proximal end and the distal end, a stiffening sleeve positioned at the distal end of the tubular member to provide stiffness thereto so that a removable procedural tool can be attached to the tubular member, and an elongated non-elastic tether situated within the channel of the tubular member and secured at one end to the distal end of the member, such that when the tether is held in tension, the tether acts to minimize the tubular member from deviating from a neutral state.

16 Claims, 27 Drawing Sheets

(51) Int. Cl.
*A61M 25/10* (2013.01)
*A61M 39/10* (2006.01)

(52) U.S. Cl.
CPC .... *A61M 25/0133* (2013.01); *A61M 25/0144* (2013.01); *A61M 25/0155* (2013.01); *A61M 39/10* (2013.01); *A61M 1/81* (2021.05); *A61M 2025/015* (2013.01); *A61M 25/10182* (2013.11); *A61M 25/10187* (2013.11)

(58) Field of Classification Search
CPC ........ A61M 25/0155; A61M 25/10182; A61M 25/10187; A61M 39/10; A61M 1/81; A61M 2025/015
See application file for complete search history.

(56) References Cited

U.S. PATENT DOCUMENTS

| | | | |
|---|---|---|---|
| 5,108,368 A * | 4/1992 | Hammerslag | A61M 25/0147 604/95.04 |
| 5,195,968 A * | 3/1993 | Lundquist | A61M 25/0147 604/95.04 |
| 5,458,571 A | 10/1995 | Lampropoulos et al. | |
| 8,491,503 B2 | 7/2013 | Zaiken et al. | |
| 8,808,169 B2 * | 8/2014 | Macnamara | A61B 1/005 600/149 |
| 10,799,268 B2 | 10/2020 | Connors et al. | |
| 2002/0103473 A1 * | 8/2002 | Roychowdhury | A61M 25/10 604/525 |
| 2003/0014010 A1 | 1/2003 | Carpenter et al. | |
| 2003/0088194 A1 * | 5/2003 | Bonnette | A61M 29/02 600/585 |
| 2004/0181150 A1 | 9/2004 | Evans et al. | |
| 2004/0236367 A1 | 11/2004 | Brown et al. | |
| 2007/0185446 A1 | 8/2007 | Accisano, III | |
| 2008/0035870 A1 | 2/2008 | Wygnanski et al. | |
| 2008/0058722 A1 | 3/2008 | Von Oepen et al. | |
| 2009/0076439 A1 | 3/2009 | Dollar et al. | |
| 2010/0130924 A1 | 5/2010 | Martin et al. | |
| 2011/0071506 A1 | 3/2011 | Gardner et al. | |
| 2011/0196341 A1 * | 8/2011 | Howell | A61M 25/10185 604/99.04 |
| 2014/0046125 A1 | 2/2014 | Gillespie, Jr. et al. | |
| 2015/0157358 A1 | 6/2015 | Mitelberg et al. | |
| 2018/0042462 A1 * | 2/2018 | Yanuma | A61B 1/00098 |

FOREIGN PATENT DOCUMENTS

| | | |
|---|---|---|
| GB | 2480166 B | 7/2013 |
| WO | 2018217516 A1 | 11/2018 |

OTHER PUBLICATIONS

International Search Report in International Patent Application No. PCT/US2022/074148, mailed Nov. 1, 2022 (2 pages).

\* cited by examiner

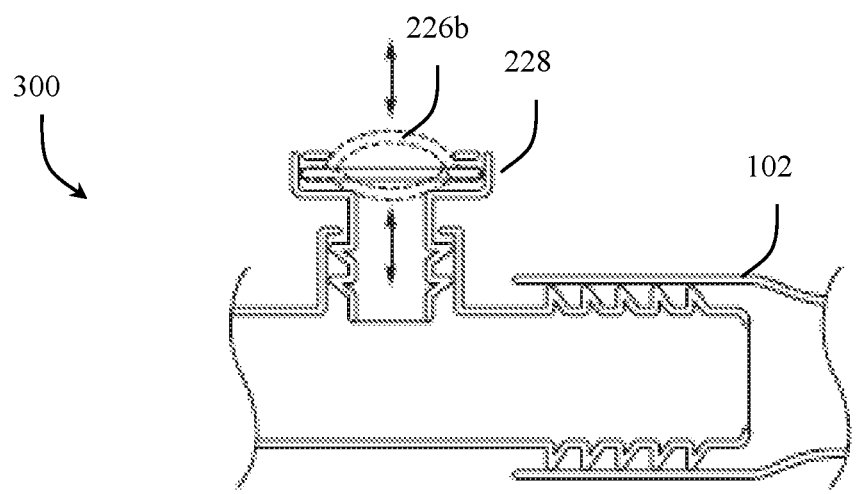
*Fig. 6A*
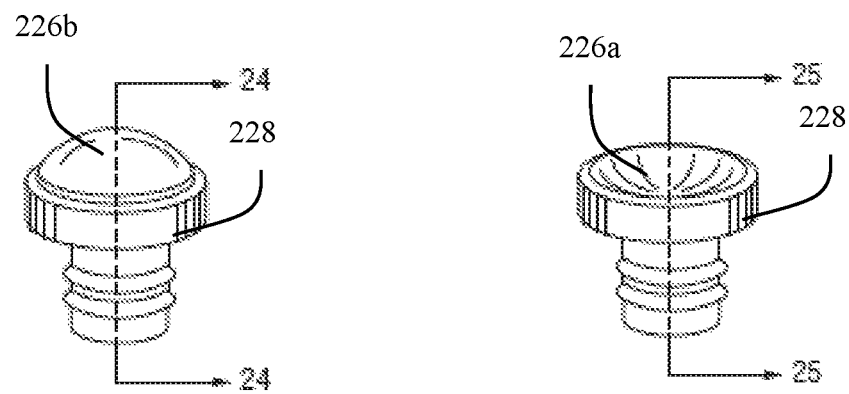
*Fig. 6B*   *Fig. 6C*
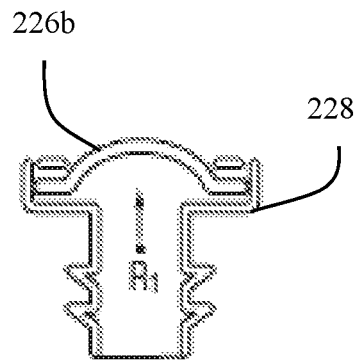  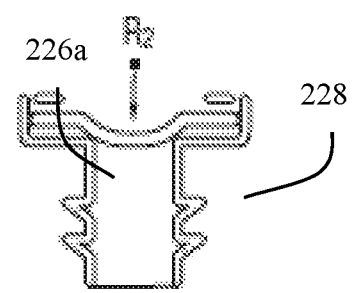
*Fig. 6D*   *Fig. 6E*

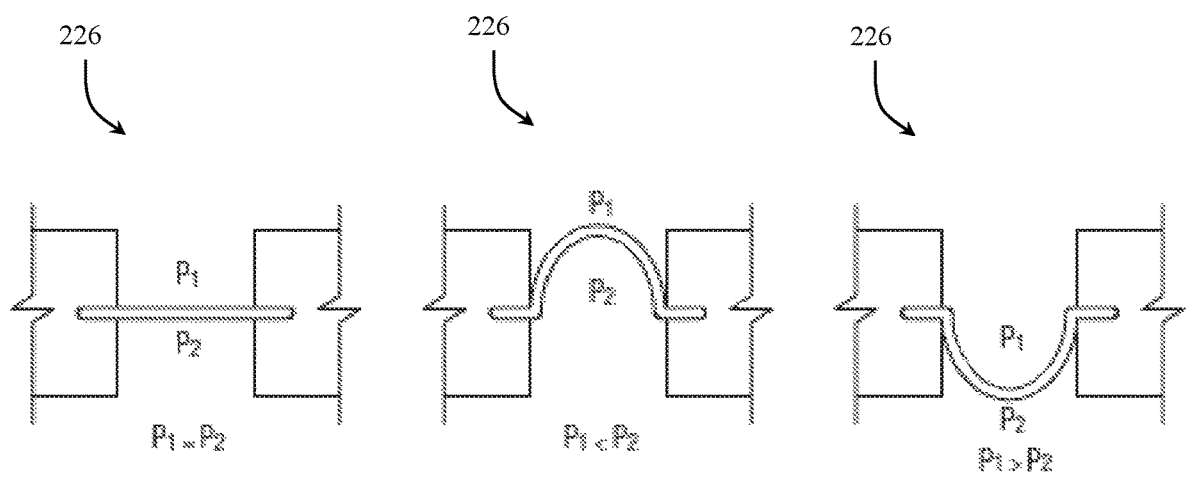
*Fig. 7A*     *Fig. 7B*     *Fig. 7C*

CATHETER DEVICE SYSTEM AND METHOD OF USE

CROSS-REFERENCE TO RELATED APPLICATION(S)

This application claims priority to, and the benefit of, U.S. Provisional Application No. 62/849,503, filed May 17, 2019, for all subject matter common to both applications. The disclosure of said provisional application is hereby incorporated by reference in its entirety.

FIELD OF THE INVENTION

The present invention relates to a catheter device suitable for use within a body lumen. In particular, the present invention relates to a unique catheter construction for use in navigating within a body lumen or vessel, such as a vein, artery, nasal cavity, esophagus, etc. to assist in the performance of various procedures.

BACKGROUND

Generally, catheters are constructed from soft and flexible materials. These materials have beneficial properties of flexibility and comfort for using within a body of a patient, however, can also be subject to unintended stretching during use. To address these unintended effects, some catheter constructions use elements (braiding, reflow of polymers, encapsulated wires, etc.) within the walls of the catheter to achieve desirable properties, such as reduced elongation of the catheter under tensile load. Catheters with in-wall constructions, however, add to manufacturing complexities, material/manufacturing costs, etc. that can limit the flexibility/bendability of the catheter, and may contribute to other unintended effects. The present invention is configured to overcome such shortcomings.

SUMMARY

There is a need for improvements for catheter constructions to be used in catheter systems and methods for navigation within a body, such as for example for use in navigating within a body lumen, vessel, etc. The present invention is directed toward further solutions to address this need, in addition to having other desirable characteristics. Specifically, the catheter systems of the present invention offer improved catheter navigation without the reliance on complex catheter construction/manufacture. In addition to assisting in the placement within a body, the catheter system and method is designed to be pliable while also resistant to elongation during therapies or removal from the body. The catheter systems and methods of the present invention can be applied to any combination of various procedures that rely on the use of a catheter.

Furthermore, there is additional need for improvement with respect to allowing physicians to "visualize" the status of the therapeutic aspect (typically the distal aspect) of a catheter-based device when it is inside the human body. Specifically, the ability to discern the activated/deactivated state at a distal end of a catheter, such as a therapeutic balloon in-vivo, without the need for direct endoscopic visualization or the use of ionizing radiation such as fluoroscopy. The present invention is directed towards allowing the user/physician to immediately tell the status of the distal section of the device via visual and/or tactile indication without necessitating use of additional devices or ionizing radiation. This provides a cost savings benefit to the hospital/facility by reducing the number of devices used in a procedure, reducing the overall complexity of the procedure and eliminating the need for specialized facilities (lead lined rooms, etc.) as well as an increase to patient/physician safety by mitigating the need for radiation-based visualization.

In accordance with example embodiments of the present invention, a device is provided. The device includes a flexible tubular member having a proximal end, a distal end, and channel extending substantially between the proximal end and the distal end, a stiffening sleeve positioned at the distal end of the tubular member to provide stiffness thereto so that a removable procedural tool can be attached to the tubular member, and an elongated non-elastic tether situated within the channel of the tubular member and secured at one end to the distal end of the member, such that when the tether is held in tension, the tether acts to minimize the tubular member from deviating from a neutral state.

In accordance with aspects of the present invention, the tubular member is a catheter. The continuous structure can be coupled to the proximal end and the distal end of the tubular member. The continuous non-elastic structure can be fixedly coupled to the proximal end. The continuous non-elastic structure can be removably coupled to the proximal end. The continuous non-elastic structure can be fixedly coupled to the distal end. The continuous non-elastic structure can be removably coupled to the distal end. The continuous structure can be coupled to the procedural tool, is coupled to the connector, and extends through at least a portion of the tubular member. The procedural tool can be at least one of a compliant balloon or a longitudinally moveable member. The connector can be at least one of a Y-connector and a T-connector.

In accordance with aspects of the present invention, the device further includes an indicator membrane on the connector. The device can further include a syringe for adjusting a pressurization through the tubular member. The device can further include a handle encasing the connector and having a viewing window showing a position of the syringe. The device can further include a housing having a fastener for receiving and holding the tubular member. The device can further include a fitting coupling the connector to the tubular member.

In accordance with example embodiments of the present invention, a system is provided. The system includes a flexible tubular member having a proximal end, a distal end, and channel extending substantially between the proximal end and the distal end, a procedural tool coupled to the distal end of the tubular member, an elongated non-elastic tether situated within the channel of the tubular member and secured at one end to the distal end of the member, such that when the tether is held in tension, the tether acts to minimize the tubular member from deviating from a neutral state, a connector coupled to the proximal end of the tubular member, and a mechanism coupled to the connector for applying positive or negative pressure to the tubular member.

In accordance with aspects of the present invention, the continuous structure is coupled to the proximal end and the distal end of the tubular member. The procedural tool can be at least one of a compliant balloon or a longitudinally moveable member. The system can further include an indicator membrane coupled to the connector to reflect the positive or negative pressure being applied to the compliant balloon.

In accordance with example embodiments of the present invention, method for operating a catheter device if provided. The method includes providing a catheter device for insertion into a lumen. The catheter device includes a tubular member with a channel extending from a proximal end to a distal end and a continuous non-elastic structure, situated within the channel of the tubular member, the continuous non-elastic structure configured to alter the mechanical behavior of the tubular member. The method also includes inserting the tubular member into the lumen, performing a procedure by pressurizing or depressurizing the tubular member, and removing the tubular member from the lumen, wherein the continuous non-elastic structure within the tubular member substantially limits elongation of the tubular member during removal.

BRIEF DESCRIPTION OF THE FIGURES

These and other characteristics of the present invention will be more fully understood by reference to the following detailed description in conjunction with the attached drawings, in which:

FIGS. 6A, 6B, 6C, 6D, 6E, 6F, and 6G are exemplary cross-sectional views of an indicator membrane configuration for a catheter device in accordance with the present invention;

FIGS. 7A, 7B, and 7C are exemplary states of operation for an indicator membrane in accordance with the present invention;

DETAILED DESCRIPTION

Figure 1:
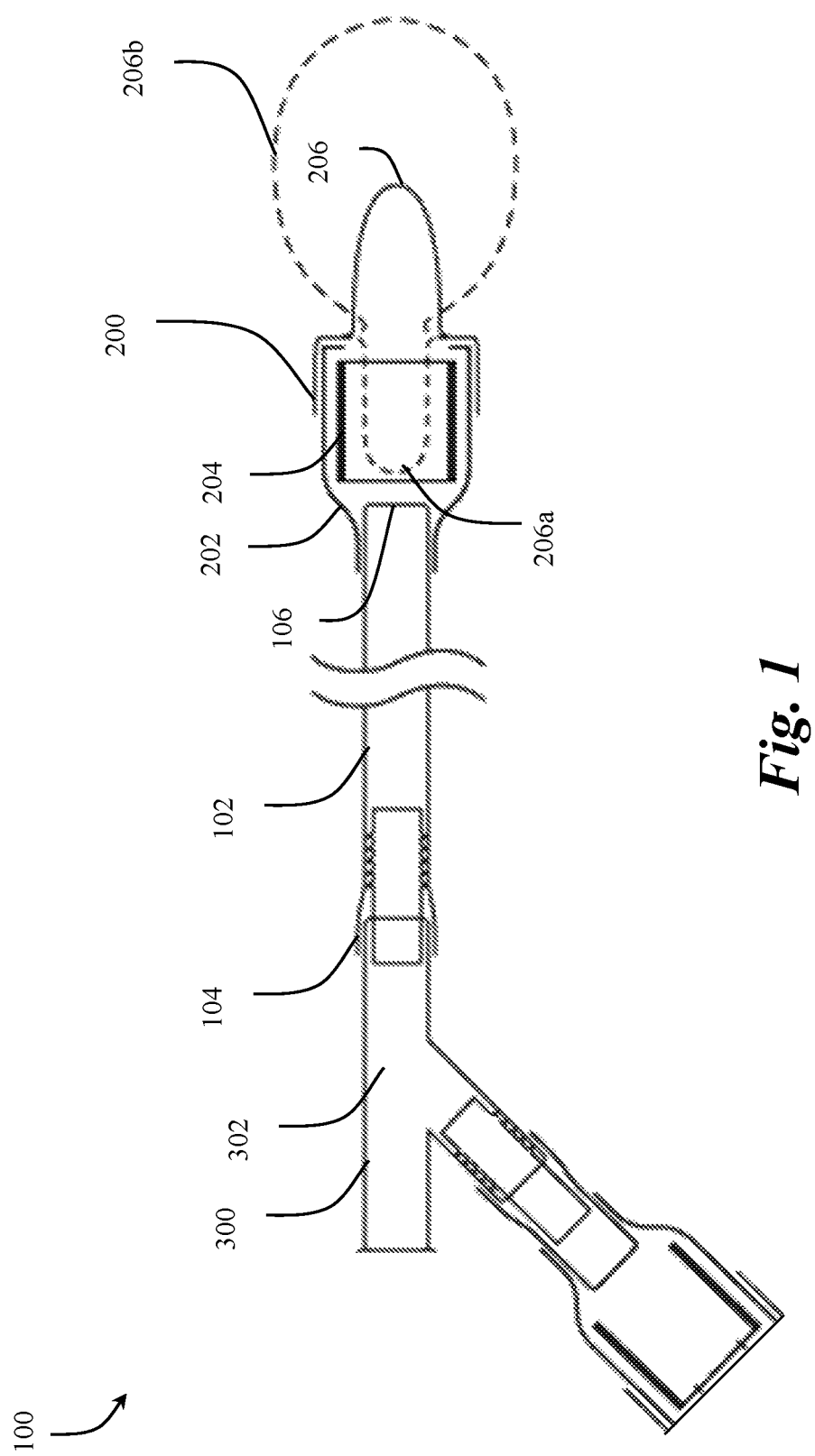
FIG. 1 is an exemplary cross-sectional view of a catheter device in accordance with the present invention.

An illustrative embodiment of the present invention relates to catheter construction for use within catheter systems and methods. The catheter systems and methods can implement a catheter device that is configured to be both flexible along the major axis while being resistant to elongation in that same longitudinal direction. The catheter device can be constructed from a flexible material for radial flexibility that is soft for comfort when inserted into a body lumen. When additional structure is needed, in some instances, the walls of the catheter device can be supplemented with other materials and structures, such as for example, braiding, reflow of polymers, etc. The soft flexible material, even including some modification to within the walls, may be subject to stretching when a longitudinal force is applied to the catheter device.

To reduce and/or eliminate longitudinal, linear, and/or axial stretching, the catheter device can have a flexible but non-elastic structure (i.e., restraint) positioned within its inner cavity or channel, such as for example, a tether. The non-elastic structure can be directly coupled to both the proximal and distal ends of the catheter device (to the catheter itself or objects coupled to the ends of the catheter) to provide a structure that restricts longitudinal stretching of the material of the catheter shaft, even if the materials of the catheter itself would be prone to such stretching. The non-elastic structure can also be coupled indirectly to the proximal and distal ends of the catheter to achieve the same result. For example, the tether can be coupled to a stylet coupled to and extending from a proximal end of the catheter device to an intermediary position within a channel of the catheter device while the tether couples to the opposing end of the stylet and the distal end of the catheter to form a continuous structure from the proximal end to the distal end of the catheter. The continuous non-elastic structure can be configured to minimize deviation of the catheter itself from its neutral state, such as for example, limit longitudinal stretching, bending properties, torquability, or a combination thereof of the catheter.

FIGS. 1 through 10B, wherein like parts are designated by like reference numerals throughout, illustrate an example embodiment or embodiments of improved operation for the catheter device, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

FIG. 1 depicts an exemplary cross-sectional side view of an exemplary catheter device 100 in accordance with the present invention. The catheter device 100 can include a procedural tool 200 at a distal section of the device and a connector 300 at a proximal section of the device 100, with a tubular member 102 extending therebetween. The procedural tool 200 and the connector 300 can include any combination of working ends for a catheter system or other procedural device that makes use of a tubular member 102. The procedural tool 200 and the connector 300 can be coupled to the tubular member 102 using any combination of mechanisms. For example, procedural tool 200 and the connector 300 can attach to the tubular member 102 via friction fit, adhesive, coupling mechanism, etc.

The tubular member 102 can be constructed from any combination of materials known in the art. For example, the tubular member 102 can be made from silicone rubber, nylon, polyurethane, polyethylene terephthalate (PET), latex, thermoplastic elastomers, etc., or a combination thereof. In some embodiments, the tubular member can be constructed to include a combination of other materials for desired structural effects. For example, the tubular member 102 can include braiding, reflow of polymers, etc. within the walls to achieve desirable properties (pushability, torquability, trackability, etc.)

In some embodiments, the tubular member 102 can include an open-ended channel extending from a proximal end 104 to a distal end 106. The tubular member 102 can also be any combination of tube-shaped devices, such as for example, a catheter. The tubular member 102 can also include any other combination of shapes without departing from the scope of the present invention, for example, the tubular member 102 can be rectangular, ovular, polygonal, etc. shaped. In some embodiments, the proximal end 104 of the tubular member 102 can be in communication with the connector 300 of the device 100, while the distal end 106 of the tubular member 102 can be in communication with the procedural tool 200 of the device 100. As would be appreciated by one skilled in the art, the connector 300 and the procedural tool 200 can be coupled to the tubular member 102 in any combination of methods known in the art. For example, the procedural tool 200 and the connector 300 can be coupled to the tubular member 102 via a friction fit, a mechanical coupling, welding, thermal bonding, an adhesive, or combination thereof. The tubular member 102 can also be coupled to the procedural tool 200 and the connector 300 using different coupling systems or methods.

In some embodiments, the procedural tool 200 can be coupled to the distal end 106 of the tubular member 102. The procedural tool 200 can include any combination of elements to both couple to the tubular member 102 and perform a procedure with the assistance of the tubular member 102. For example, the procedural tool 200 can include a procedural housing 202 (e.g., a capsule), a stiffening sleeve 204, and a working end 206 (e.g., one or more balloons). The procedural housing 202 can be coupled to or be an extension of the distal end 106 of the tubular member 102. For example, the procedural housing 202 can be coupled to the outside or inside of the tubular member 102 or can be an extension thereof. In some embodiments, the tubular member 102 and/or procedural housing 202 can be constructed from a substantially soft material to provide comfort to a patient. For example, the procedural housing 202 can be constructed from a polypropylene material to assist in swallowing the device 100. The procedural housing 202 can be a solid structure, it can include a hollow cavity, it can include a mechanical tool, or a combination thereof that with access to the channel of the tubular member 102 via an open end at the distal end 106. As would be appreciated by one skilled in the art, the catheter device 100 can include any combination of procedural tools known in the art coupled to the procedural tool 200 without departing from the scope of the present invention.

In some embodiments, the stiffening sleeve 204 can be included within a cavity of the procedural housing 202 to provide a sufficiently rigid structure to provide hoop strength and for maintaining or creating a desired shape of the procedural housing 202. The stiffening sleeve 204 can be positioned at the distal end of the tubular member 102 to provide sufficient stiffness thereto so that a removable working end 206 can be attached to the tubular member 102. The stiffening sleeve 204 can be any combination of shapes and sizes to provide strength to the procedural housing 202. For example, the stiffening sleeve 204 can be a substantially tubular shaped device wrapping around at least a portion of the inner circumference of the procedural housing 202. Similarly, the stiffening sleeve 204 can be constructed from any sufficiently rigid materials, such as for example, metal, plastic, etc. to provide a sufficiently rigid structure of the housing 202. The stiffening sleeve 204 can be positioned within the procedural housing 202 through any combination of means known in the art. For example, the stiffening sleeve 204 can be installed within the procedural housing 202 via a friction fit, injection molding, etc. In some embodiments, the stiffening structure 202 can be provided at the end of the tubular member 102 without the presence of a procedural housing 202.

Figure 2A:
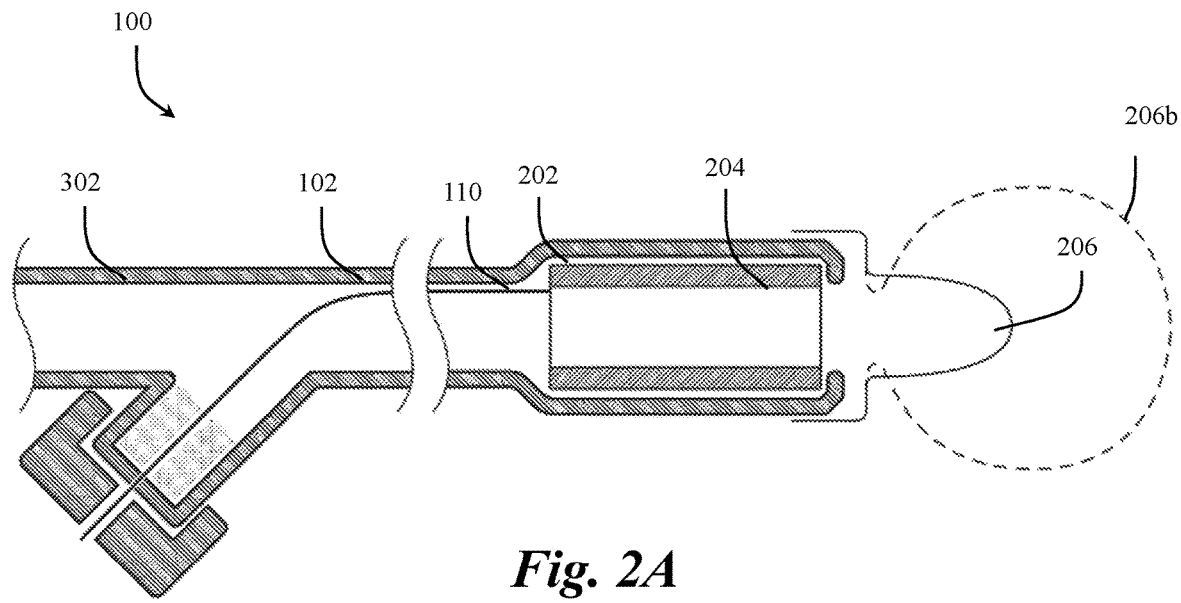
FIGS. 2A and 2B are exemplary cross-sectional views of a catheter device in accordance with the present invention.
Figure 2B:
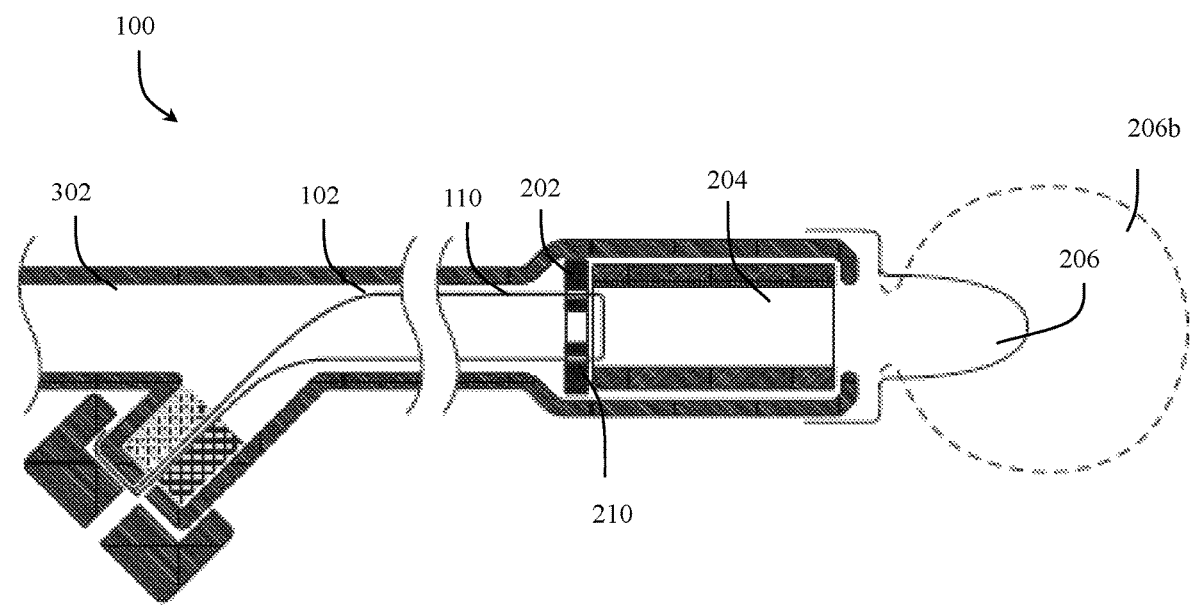

In some embodiments, as depicted in FIGS. 1, 2A, and 2B, the working end 206 can be configured with one or more balloons, for example, to expand a location, anchor part of the working end 206, contact an inner wall of the body, deliver medication, etc. The one or more balloons can be coupled to the procedural housing 202, for example, at an end opposing the end of the procedural housing 202 coupled to the tubular member 102. The working end 206 can be coupled to or be an extension of the procedural housing 202. For example, the working end 206 can be coupled to the outside or inside of the housing 202 structure, the tubular member 102, or a combination thereof. In some embodiments, the working end 206 can be constructed from a substantially flexible material to provide a transition between states (e.g., inflated or deflated) when a positive or negative pressure is applied through the tubular member 102. For example, the working end 206 can be constructed from a rubber or silicone material. In some embodiments, the tubular member 102, the procedural housing 202 and the working end 206 can all be constructed from the same material, for example, silicone.

In some embodiments, the working end 206 can be configured to transition between a plurality of states depending on a level and type of pressurization applied through the tubular member 202, via the procedural housing 202 cavity. The working end 206 can be configured to transaction back and forth between the different states 206, 206a, 206b. For example, a positive pressure can be applied via the connector 300 and through the tubular member 102 to inflate the working end 206 (to state 206b) and then a negative pressure can be applied to deflate the working end 206 and optionally retract the working end 206 into the procedural housing 202 (to state 206a). As would be appreciated by one skilled in the art, depending on the configuration of the working end 206, the application of positive or negative pressure can have effects not limited to inflation/deflation of one or more balloons. For example, changes in pressurization applied to the working end 206 can cause components of the working end to actuate, open/close, rotate, etc.

Continuing with FIG. 1, in some embodiments, the connector 300 of the device 100 can be include or otherwise be attached to an input mechanism for pressurizing and depressurizing the tubular member 102. The pressurization or depressurization of the tubular member 102 can be provided for controlling the states of the procedural tool 206 at the procedural tool 200 (e.g., the working end 206). For example, the connector 300 of the device can include a Y-connector 302 for accepting a mechanism (e.g., a syringe) for controlling the state of the working end 206. As would be appreciated by one skilled in the art, the functionality of the Y-connector 302 can be implemented using another connection, such as for example, a T-connector or V-connector. The Y-connector 302 (or other connector) can be used to introduce gas or fluid into the tubular member 102 to modify the state of the working end 206. For example, the Y-connector 302 can receive gas or fluid from a syringe or other input and pass the gas or fluid through the channel of the tubular member 102 into the cavity of the procedural housing 202. Similarly, the Y-connector 302 can be used to withdraw gas or fluid from the tubular member 102 or the cavity of the procedural housing 202.

Referring to FIGS. 2A and 2B, in some embodiments, the catheter device 100 can include a continuous non-elastic (or non-elongating) structure, referred interchangeably with other terms herein as a tether 110. The tether 110 can be a structure designed to nullify one or more properties of the tubular member 102. For example, the tether 110 can be positioned within an inner lumen of the tubular member 102 to limit longitudinal stretching, bending properties, torquability, or a combination thereof of the tubular member 102 when the tubular member 102 is made of a flexible material (e.g., for ease of navigation). The tether can be anchored by some means at both ends of the tubular member 102 to prevent axial stretching without imparting additional stiffness. The tether 110 can be free moving within the tubular member 102 while maintaining a predetermined length between the connection 300 and the procedural tool 200.

To the extent that the tubular member 102 can be made from a stretchable material (i.e., elastic) to assist in comfort during navigation within the body during operation, it may stretch then spring back to a neutral state in a "rubber banding" motion during use, causing unintended consequences (e.g., harm and/or discomfort to a patient) or inadequate/incomplete application of the intended therapy, without the tether 110. To that end, in some embodiments, the tether 110 can be positioned to extend within or part of the tubular member 102, creating a continuous structure between the connector 300 and the procedural tool 200 of the device 100, to provide longitudinal support to prevent the tubular member 102 from stretching longitudinally while maintain the flexibility of the device 100. In some embodiments, the tether 110 could also be placed outside and coupled to the tubular member 102 to provide a similar effect.

In some embodiments, the tether 110 can be designed to be held in tension throughout at least a portion of the tubular member 102. When tension is applied to opposite ends of the tether 110, the tether 110 can act to minimize the tubular member 102 from deviating from its neutral state. In some embodiments, the tether 110 can be held in tension by having one or more connections at each end of the tubular member 102. In other embodiments, tension can manually be held in tension at one or both ends of the tether 110, for example, by applying a pulling force to at least one end of the tether 110. In some embodiments, the tether 110 can act to provide axial strength to push tubular member 102 forward.

In some embodiments, the tether 110 can be fixedly attached to one or both ends of the tubular member 102 and/or to a combination of the procedural tool 200 and the connector 300 of the device 100. Alternatively, the tether 110 can be removably coupled to the tubular member 102 and/or one or both procedural tool 200 and the connector 300 of the device 100. The tether 110 can be coupled to any combination of components using any combination of methods. Regardless of where the ends of tether 110 are coupled, the tether 110 can be used to establish a consistent connection between the procedural tool 200 and the connector 300 of a catheter device 100 to prevent any stretching of the tubular member 102. For example, the tether 110 can extend at least the full length of the tubular member 102 from the procedural tool 200 to the connector 300 or the tether 110 can act as a bridge between two components within the tubular member 102 to establish a consistent connection between the ends 200, 300. In some embodiments, the tether 110 can be free floating within the tubular member 102, adhered to the inner and/or outer sidewall of the tubular member 102, or embedded within the walls of the tubular member 102.

The tether 110, in some embodiments, can be constructed from a non-elastic material, such as for example, natural thread, woven polyester, plastic, stainless steel, carbon fiber, non-Newtonian material, etc. or a combination thereof. The tether 110 can be a single non-elastic component, a plurality of non-elastic components, or multiple non-elastic components coupled together to operate as a single continuous non-elastic construction. For example, the tether 110 can be a wire, cable, a string, a rod, a mandrel, linked chain, or a combination thereof looped, tied, coupled, etc. together. Similarly, the tether 110 can include any combination of dimensions that prevent stretching of the tubular member 102 while maintaining flexibility for navigation. For example, the tether 110 can have varying diameter along the length, they may be different materials along the length or other varying material properties, varying cross-section along the length.

Referring to FIGS. 3A-3L, the tether 110 can be provided through the tubular member 102 (or along the tubular member 102) and then coupled to the end of the distal end 106 of the tubular member 102 and/or the procedural tool 200 using a combination of systems and methods. For example, the various methods can include thermal bonding, adhesive bonding, welding, knots, mechanical loops, etc. The tether 110 can be fixedly attached or removably attached to the tubular member 102 and/or the procedural tool 200. FIGS. 3A-3L show cross-sectional side views of the tether 110 and how it may be attached to the procedural tool 200. Although the examples provided in FIGS. 3A-3L show connections with the procedural tool, any combination of the same methods can be implemented to couple the tether 110 to a distal end of the tubular member 102 itself.

Figure 3A:
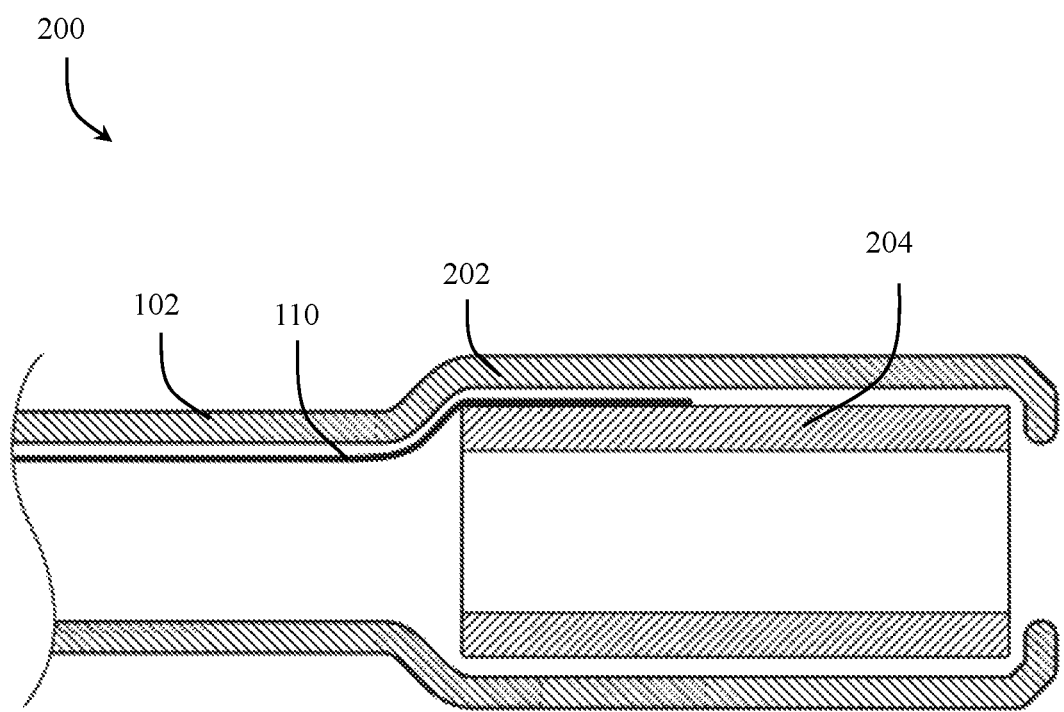
FIGS. 3A, 3B, 3C, 3D, 3E, 3F, 3G, 3H, 3I, 3J, 3K, 3L, 3M, and 3N are exemplary cross-sectional views of a tether coupled to a distal end of the catheter device in accordance with the present invention.

Referring to FIG. 3A, in some embodiments, the tether 110 can be fixedly coupled to the stiffening sleeve 204 of the procedural tool 200. For example, the tether 110 can be fixedly coupled to the stiffening sleeve 204 through an adhesive material, laser weld, friction fit, etc. As depicted in FIG. 3A, the tether 110 can be inserted through and between a gap between the stiffening sleeve 204 and the housing 102 and coupled to a surface of the stiffening sleeve 204 between the exterior surface of the stiffening sleeve 204 and the interior surface of the procedural housing 202. As would be appreciated by one skilled in the art, the tether 110 could similarly be coupled to the interior surface of the stiffening sleeve 204 above the surface of the stiffening sleeve 204. In this implementation, the distal end of the tether 110 can terminate within the housing 202, however, the design of FIG. 3A can be used at any point of the device 100 by having the distal end of the tether 110 terminating at any point between the proximal or distal end of the device 100.

Figure 3B:
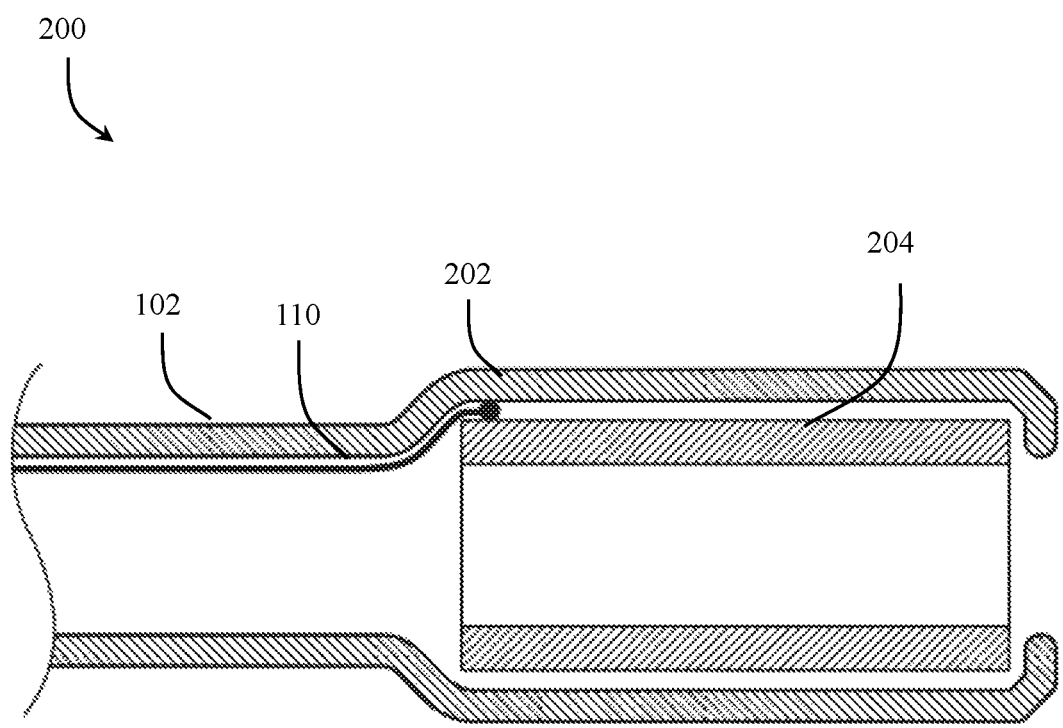

Referring to FIG. 3B, in some embodiments, the distal end of the tether 110 can be used to form a shape, such as, a loop, 'T' shape, dead man anchor, ball shape, etc. located within the procedural tool 200 and of sufficient size and shape to hold the tether 110 in place between the stiffening sleeve 204 and the procedural tool 200. For example, the distal end of the tether 110 can be used to form a shape that can create a friction fit between the stiffening sleeve 204 and the procedural tool 200. The shape of the tether 110 may be closed using any combination of methods, for example, via welding, wire forming, crimped, etc. The shaped distal end of the tether 110 can also be molded and/or mechanically coupled between the sidewall of the procedural housing 202 and the sidewall of the stiffening sleeve 204. In this implementation, the distal end of the tether 110 can terminate within the housing 202, however, the design of FIG. 3B can be used at any point of the device 100 by having the distal end of the tether 110 terminating at any point between the proximal or distal end of the device 100.

Figure 3C:
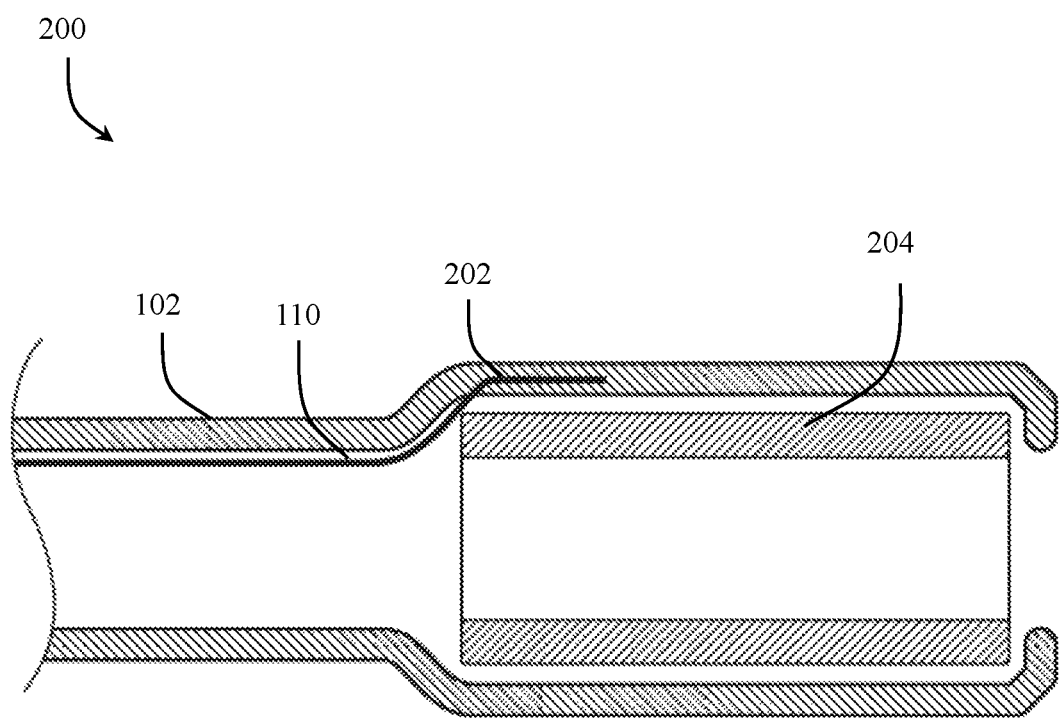

Referring to FIG. 3C, in some embodiments, the distal end of the tether 110 can be embedded into one or in between two or more layers during the manufacturing process. For example, as shown in FIG. 3C, the tether 110 may be molded, heat shrunk, adhered, bonded, compressed, etc. within one of the layers forming the procedural housing 202. The tether 110 can also be formed into any combination of the tubular member 102, the procedural housing 202, and the stiffening sleeve 204 using any combination of methods. In this implementation, the distal end of the tether 110 can terminate within the housing 202, however, the design of FIG. 3C can be used at any point of the device 100 by having the distal end of the tether 110 terminating at any point between the proximal or distal end of the device 100.

Figure 3D:
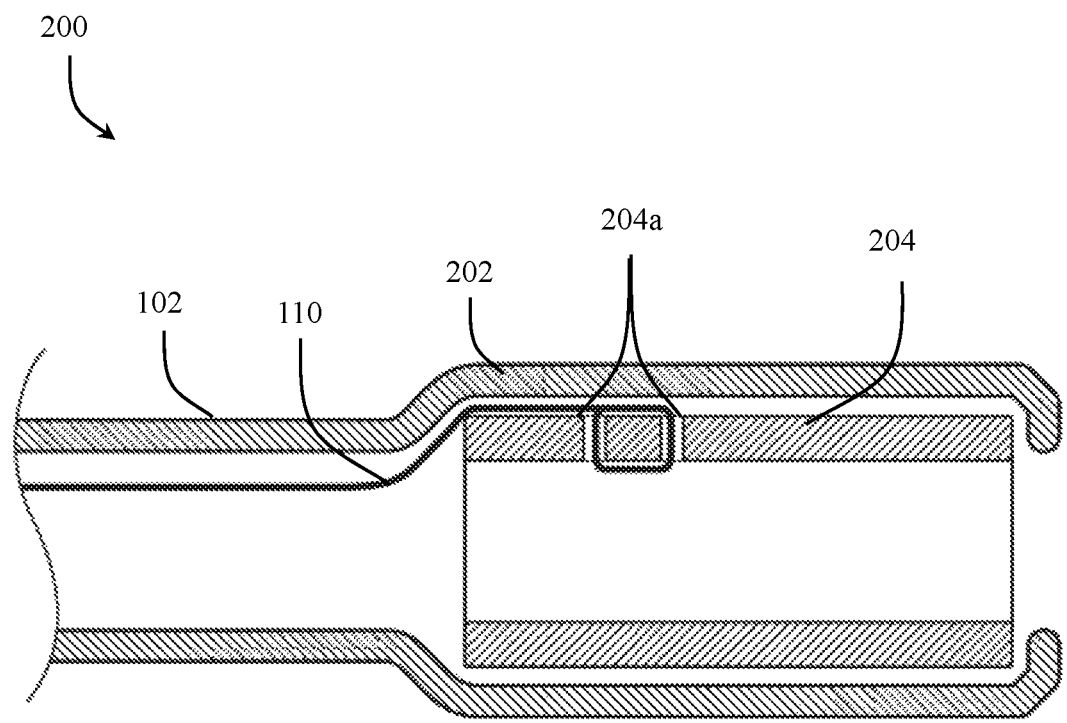

Referring to FIG. 3D, in some embodiments, the tether 110 can be looped through one or more openings 204a within the stiffening sleeve 204. As shown in FIG. 3D, the tether 110 can be inserted between the stiffening sleeve 204 and procedural housing 202 into a first opening 204a looped around a portion of the stiffening sleeve 204 and into a second opening 204a to be attached to itself or one of the tubular member 102, the procedural housing 202, and the stiffening sleeve 204 using any combination of methods. For example, after looping through the stiffening sleeve 204, the tether 110 can be bonded to itself or to the distal member via adhesive, mechanical compression, crimping, welding, etc. The tether 110 can also be looped through any number of the components, 102, 202, 204 and through any number of openings 204a to create a coupling. For example, the tether 110 can loop through at least a portion of the housing 202 into one or more openings 204a within the sleeve 204 and then bonded to the tubular member 202. In this implementation, the distal end of the tether 110 can terminate within the housing 202, however, the design of FIG. 3D can be used at any point of the device 100 by having the distal end of the tether 110 terminating at any point between the proximal or distal end of the device 100.

Figure 3E:
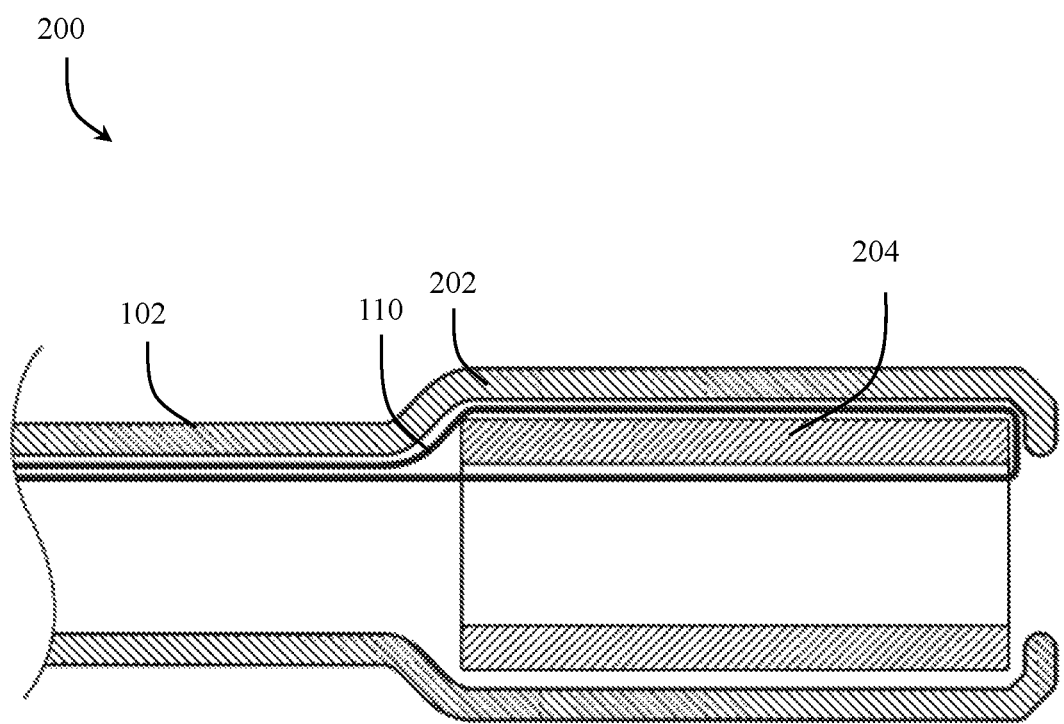

Referring to FIG. 3E, in some embodiments, the tether 110 can be looped around a length of the stiffening sleeve 204 itself without having openings within the wall of the sleeve 204, for example, as provided in FIG. 3D. After looping, the tether 110 can be bonded to itself or to another component 102, 202, 204 using any combination of methods, for example, via adhesive, mechanical compression, crimping, welding, etc. In some embodiments, the tether 110 can be inserted through and between a gap between the stiffening sleeve 204 and the housing 202, looped around a length of the stiffening sleeve 204 at a distal end of the device 100, and then returned back through the tubular member 102 to the proximal end of the device 100 for coupling at the proximal end. In this implementation, the distal end of the tether 110 can terminate at the proximal end 300 of the device 100, however, the design of FIG. 3E can be used at any point of the device 100 by having the distal end of the tether 110 terminating at any point between the proximal or distal end of the device 100.

Figure 3F:
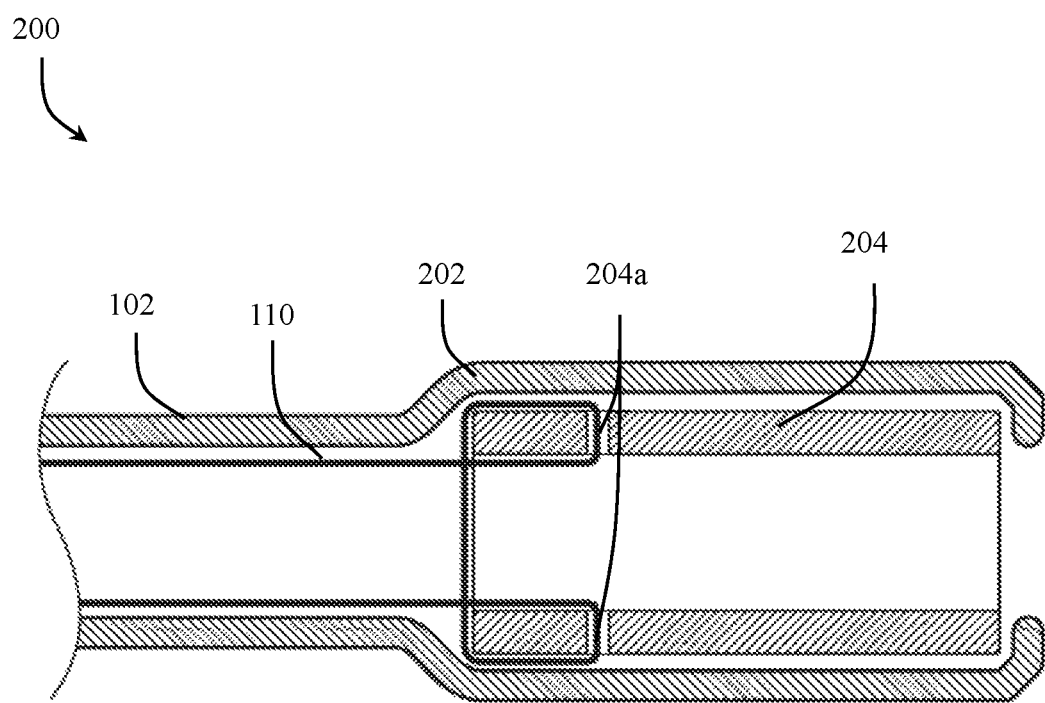

Referring to FIG. 3F, in some embodiments, the tether 110 can be threaded through/looped through one or more openings 204a within the stiffening sleeve 204 and doubled-back longitudinally through the tubular member 102. For example, the tether 110 can be loop through two opposing openings 204a within the stiffening sleeve 204 and looped back into the tubular member 102. The tether 110 can be looped through openings 204a within the stiffening sleeve 204 in any configuration. For example, as depicted in FIG. 3F, the tether 110 can be inserted through an opening into the interior portion of the stiffening sleeve 204, into a first opening 204a in the stiffening sleeve 204, passed through a gap between the stiffening sleeve 204 and the housing 202, back around a proximal end of the stiffening sleeve 204 toward an opposing side of the stiffening sleeve 204 (in a perpendicular direction to the central axis of the stiffening sleeve 204), passed through a gap between the stiffening sleeve 204 and the housing 202 on the opposing side, into a second opening 204a, looped around the stiffening sleeve 204, then returning through the tubular member 102. The tether 110 can also be inserted in the opposite order as well, for example, initially inserted between the stiffening sleeve 204 and the housing 202 to create a similar pattern. In some embodiments, in the configuration shown in FIG. 3F, both ends of the tether 110 can be coupled at the proximal end 300 of the device 100, although the ends of the tether 110 can be terminated anywhere along the length between the distal end 200 and the proximal end 300.

Figure 3G:
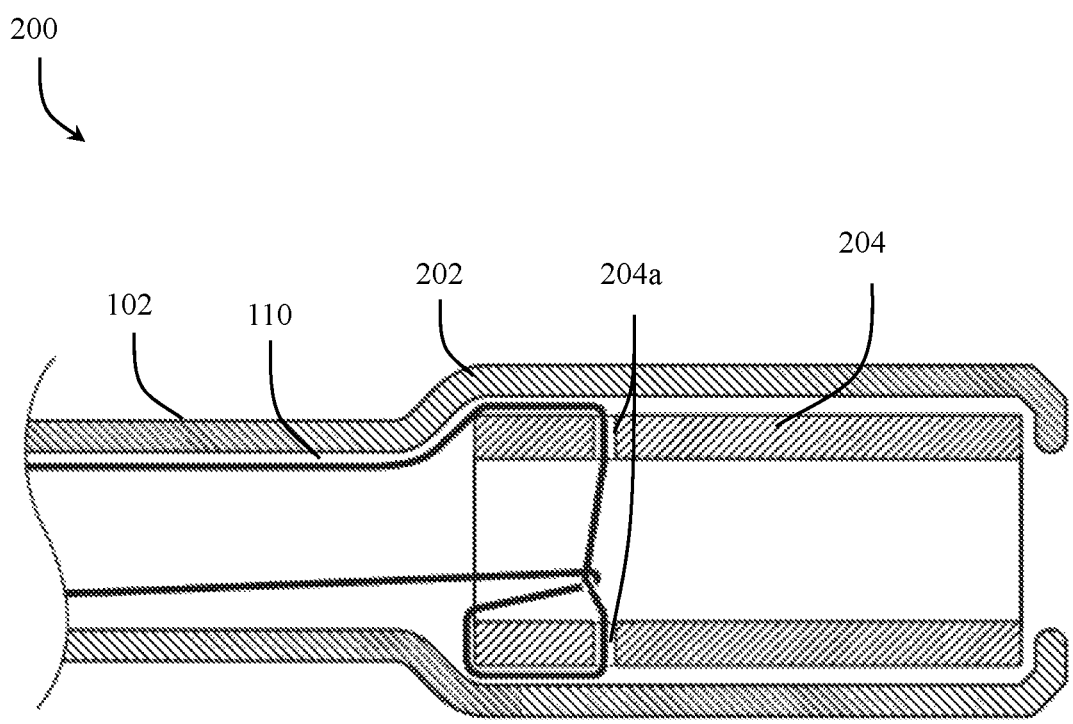

Referring to FIG. 3G, in some embodiments, the tether 110 can be threaded through/looped through one or more openings 204a within the stiffening sleeve 204, looped around itself, and doubled-back longitudinally through the tubular member 102. For example, the tether 110 can be loop through two opposing openings 204a within the stiffening sleeve 204, looped over a portion of itself, and looped back into the tubular member 102. The tether 110 can be looped through openings 204a within the stiffening sleeve 204 and over itself in any configuration. For example, as depicted in FIG. 3F, the tether 110 can be inserted through a gap between the stiffening sleeve 204 and the housing 202, into a first opening 204a into the interior portion of the stiffening sleeve 204 toward an opposing side of the stiffening sleeve 204 (in a perpendicular direction to the central axis of the stiffening sleeve 204), through a second opening the stiffening sleeve 204, passed around a proximal end of the stiffening sleeve 204, looped over and around the portion of the tether 110 extending between the two openings 204a, and then returning through the tubular member 102. In this configuration, the tension of the tether 110 can be substantially centered to prevent inadvertent "steering" of the distal end of the device 100 when the tether is under load, for example, as could potentially occur in a configuration such as FIG. 3A-3E.

Continuing with FIGS. 3F and 3G, the distal loops of the tether 110 may be configured in such a way that it does not obstruct the inner cavity of the procedural housing 202, or such that it pulls itself taut and does not obstruct the inner cavity of the procedural housing 202, such that it will not interfere with the inversion of the working end 206. In this implementation, the distal end of the tether 110 can terminate at the proximal end 300 of the device 100, however, the design of FIGS. 3F and 3G can be used at any point of the device 100 by having the distal end of the tether 110 terminating at any point between the proximal or distal end of the device 100.

Figure 3H:
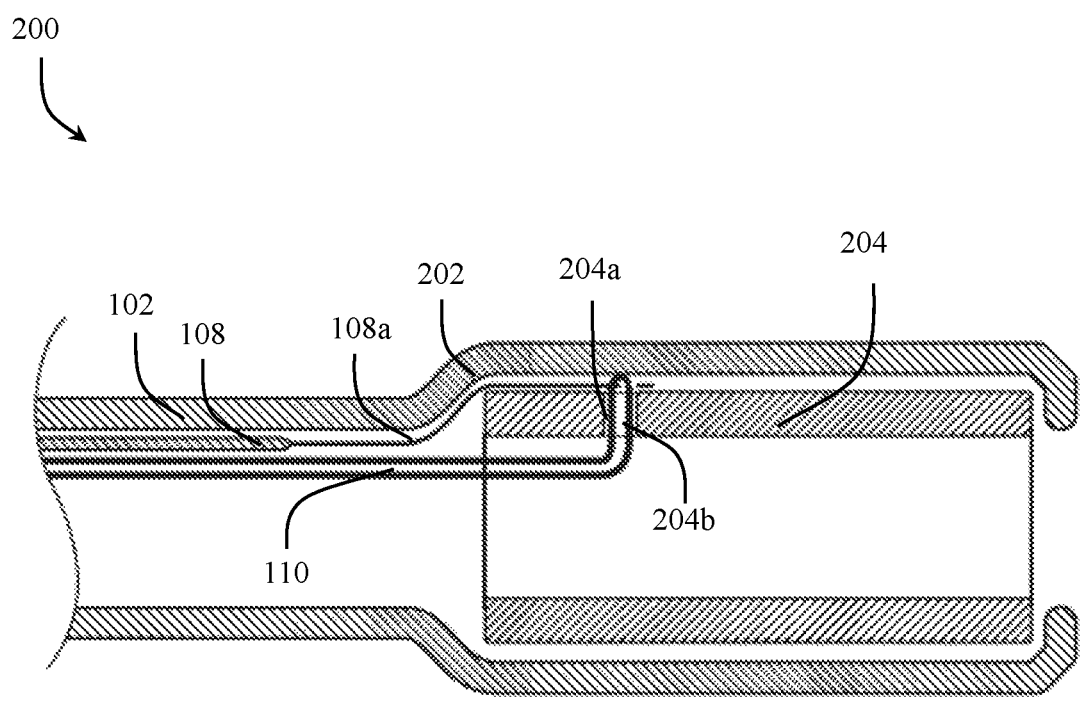

Referring to FIG. 3H, in some embodiments, the catheter device 100 can include a stylet 108 extending from the connector 300, through the tubular member 102 and terminating at a location within the tubular member 102 near the procedural tool 200. The stylet 108 can provide a sufficiently rigid structure with increased bending stiffness to the tubular member 102 to allow the tubular member 102 to be pushed through a non-linear body. The stylet 108 can be fixed at one end of the device 100 (e.g., the connector 300) to provide increased bending stiffness/pushability for a discrete portion of the overall device 100 length (i.e., to allow a more flexible distal end of the tubular member 102). In some embodiments, the stylet 108 can be coupled to both the connector 300 and procedural tool 200 and can be used in place of the tether 110.

In some embodiments, as shown in FIG. 3H, the stylet 108 can terminate at a point within the tubular member 102 before the distal end 106 of the tubular member 102. The tether 110 can be coupled to the distal end of the stylet 108 and to the procedural tool 200 (e.g., housing 202) to create a continuous non-elastic structure between the connector 300 and the working tool 200, as shown in FIG. 3H and FIG. 4B. This configuration can enable the procedural housing 202 to flex for comfort and navigation during bends/turns within the vessel (e.g., so that the tubular member 102 does not push directly into and/or puncture a sidewall). In some embodiments, the stylet 108 can be constructed from a sufficiently rigid material to provide a stiffened spine for the tubular member 102 without penetrating the sidewall of the tubular member 102 when encountering a change of direction or bend within the vessel. For example, the stylet 108 can be made of a combination stainless steel, PEEK, or other metals and polymers.

Continuing with FIG. 3H, in some embodiments, the tether 110 can be formed into a loop 204b at the stiffening sleeve 204. For example, the loop 204b can be closed or can be doubled-back longitudinally and passes through a feature 204b within the stiffening sleeve 204. The tether 110 can be inserted into an interior portion of the sleeve 204, into an opening 204a within the sleeve 204, looped around the feature positioned within the opening 204a, and returned back through the interior of the sleeve 204 through the interior of the tubular member 102. In some embodiments, multiple non-elongated constructions can be used in combination. For example, as depicted in FIG. 3H, a longitudinal member 108a, which may be a ground mandrel, a wire or component, can be used in combination with the tether 110. The longitudinal member 108a can optionally extending from a stylet 108 to provide different levels of rigidity for different effects or it can be part of the stylet 108 itself.

Continuing with FIG. 3H, the first tether 110 and the longitudinal member 108a can be separately coupled to the distal end of the tubular member 102, the sleeve 204, and/or housing 202 or they can be coupled to one another. For example, as shown in FIG. 3H, the longitudinal member 108a can be passed through a gap between the sleeve 204 and the housing 202 and further through the loop 204b created by the tether 110 passing through the opening 204a to prevent the loops from pulling back through the feature on the tubular member 102. For example, a ground down section of the stylet 108 can be assembled through the loop 204b. When the tether 110 is loaded in tension the loop 204b cannot be pulled back though the hole 204a in the sleeve because the pin is retaining it. In this configuration the first tether 110 and the longitudinal member 108a can act together as a single continuous structure (e.g., as a single tether 110). Such a configuration of the tether 110 and longitudinal member 110a can form a hitch and pin type mechanical structure. For example, tether 110 can be a formable string, wire, etc. that can be formed into a loop (hitch) and longitudinal member 108a can be a narrowed extension of the stylet 108 that passes distally through the loop (pin) formed by the tether 110 and secured to the loop to prevent it from pulling out due to axial load. In this implementation, the distal end of the tether 110 can terminate at the proximal end 300 of the device 100, however, the design of FIG. 3H can be used at any point of the device 100 by having the distal end of the tether 110 terminating at any point between the proximal or distal end of the device 100.

Figure 3I:
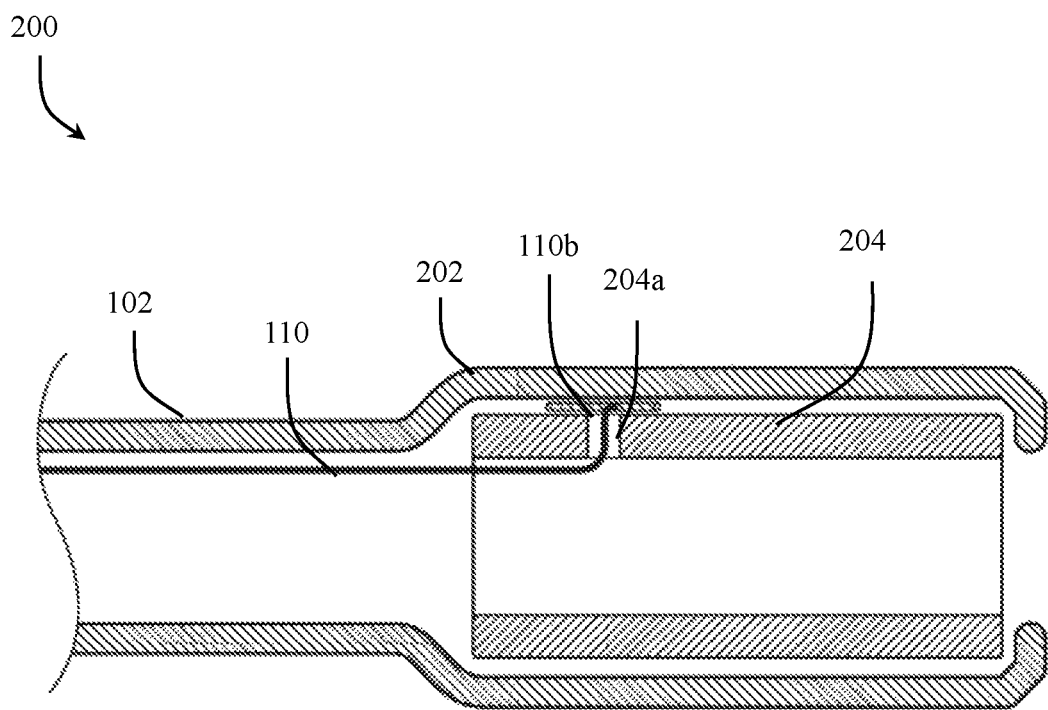

Referring to FIG. 3I, in some embodiments, the tether 110 can be coupled, within the procedural tool 200, to a separate anchoring member 110b. For example, the tether 110 can be inserted into an interior portion of the sleeve 204, into an opening 204a within the sleeve 204, coupled to and/or embedded within a separate anchoring member 110b using various methods such as adhesives, welding, crimping, etc. The separate anchoring member 110b can be inserted through/onto features of the distal member to allow anchoring of the tether 110 to the stiffening sleeve 204. In this implementation, the distal end of the tether 110 can terminate within the housing 202, however, the design of FIG. 3I can be used at any point of the device 100 by having the distal end of the tether 110 terminating at any point between the proximal or distal end of the device 100.

Figure 3J:
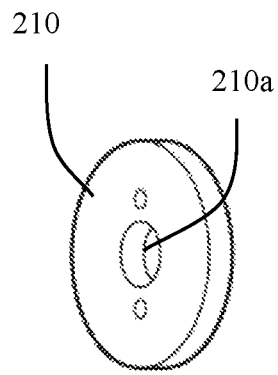
Figure 3K:
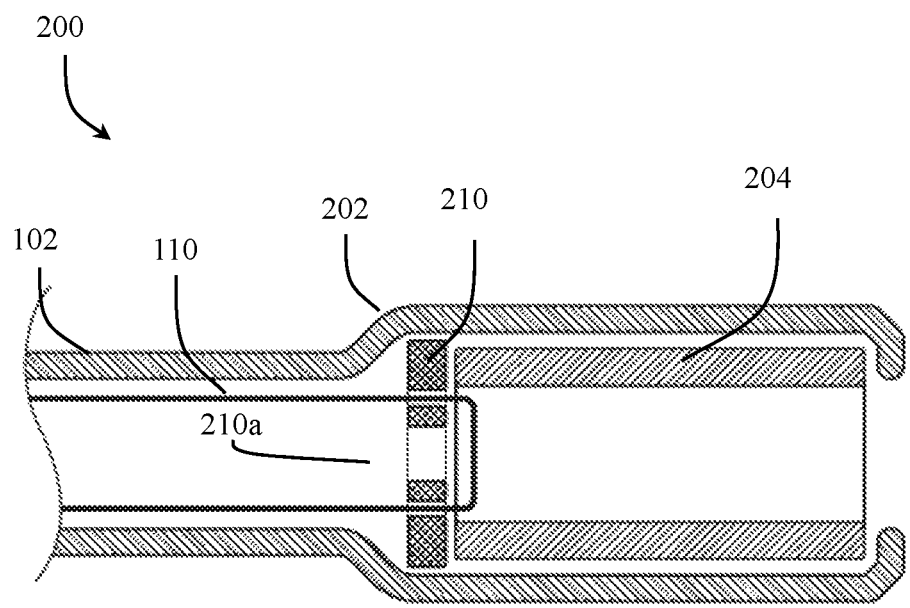

Referring to FIGS. 3J and 3K, in some embodiments, the procedural tool 200 can include one or more anchoring discs 210 for coupling the tether 110 to the procedural tool 200. Referring to FIG. 3J, a perspective view of an exemplary anchoring disc 210 is depicted. The anchoring disc 210 can include any combination of sizes and shaped for be included within the housing 202. For example, as shown in FIG. 3J, the anchoring disc 210 can be a substantially round disc shape with a plurality of holes including a centralized hole 210a. The holes can be provided as entry points for a tether 110 to be looped through. The anchoring disc 210 can be sufficiently rigid to support a tether 110 therethrough while maintaining the tether 110 in sufficient tension to provide the non-elastic effect. The anchoring disc 210 can also be sized to fit within and/or couple to different locations within the housing 202.

Referring to FIG. 3K, in some embodiments, the anchoring disc 210 can be sized and shaped to be positioned within a proximal portion of the housing 202 substantially perpendicular and adjacent to the proximal end of the sleeve 204. The anchoring disc 210 positioned can be coupled (e.g., adhesive, weld, mechanical coupling, etc.) to any combination of the housing 202 and sleeve 204 or the anchoring disc 210 can be uncoupled from the housing 202 and sleeve 204 and held in place via a friction fit based on a relationship with the housing 202 and/or sleeve 204. With the anchoring disc 210 positioned within the housing 202, the tether 110 can be looped through the one or more holes in an anchoring disc 210. For example, the tether 110 can be inserted through a first hole within the anchoring disc 210 looped around and out of a second hole in the anchoring disc 210 back into the tubular member 102, as shown in FIG. 3K. In this implementation, the distal end of the tether 110 can terminate at the proximal end 300 of the device 100, however, the design of FIG. 3K can be used at any point of the device 100 by having the distal end of the tether 110 terminating at any point between the proximal or distal end of the device 100.

Figure 3L:
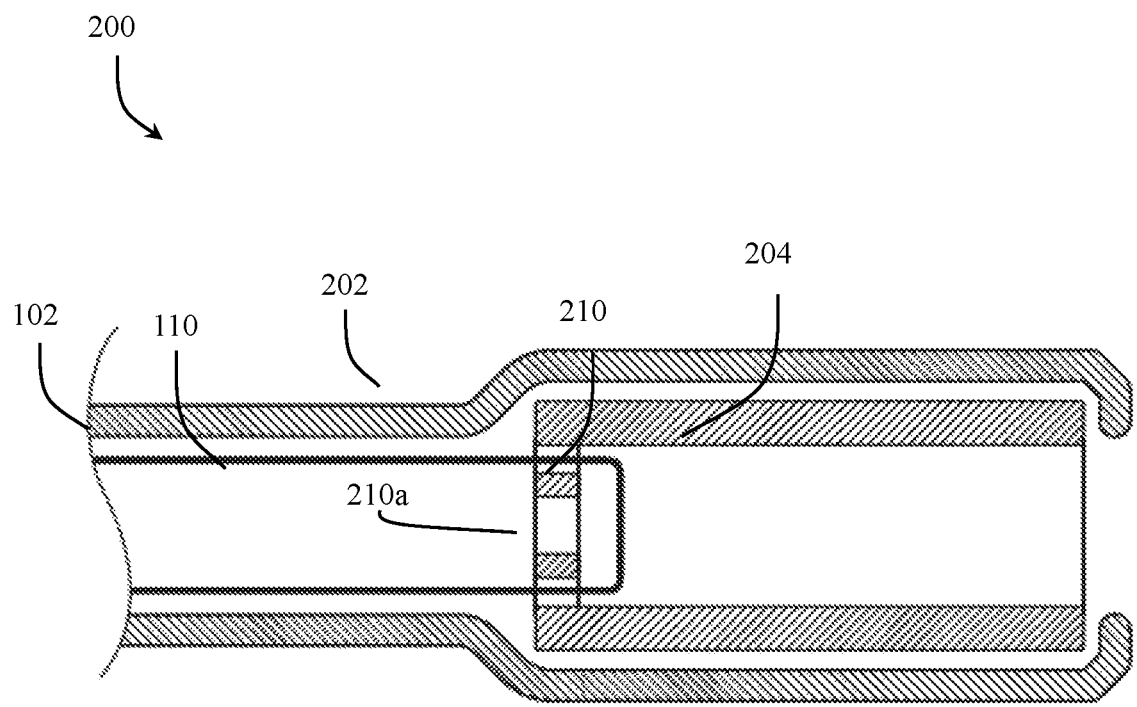

Referring to FIG. 3L, in some embodiments, the anchoring disc 210 can be sized and shaped to be positioned within a proximal portion of the sleeve 204 extending substantially perpendicular and adjacent to the proximal end of the sleeve 204. With the anchoring disc 210 positioned within the sleeve 204, the tether 110 can be looped through the one or more holes in an anchoring disc 210. For example, the tether 110 can be looped through one or more holes in an anchoring disc 210 configured as a proximal base structure of the stiffening sleeve 204. In this implementation, the distal end of the tether 110 can terminate at the proximal end 300 of the device 100, however, the design of FIG. 3L can be used at any point of the device 100 by having the distal end of the tether 110 terminating at any point between the proximal or distal end of the device 100.

Figure 3M:
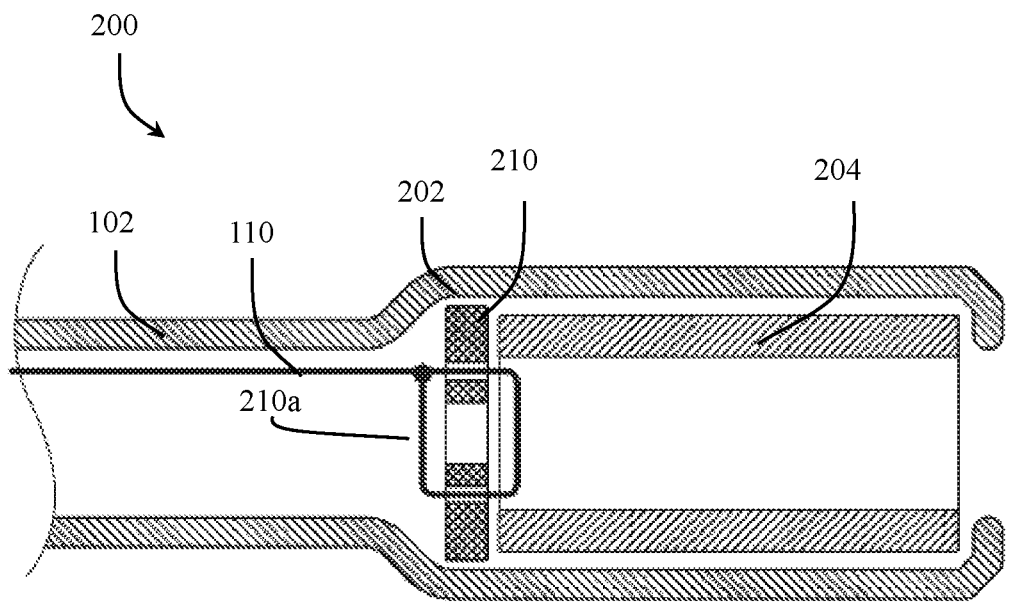
Figure 3N:
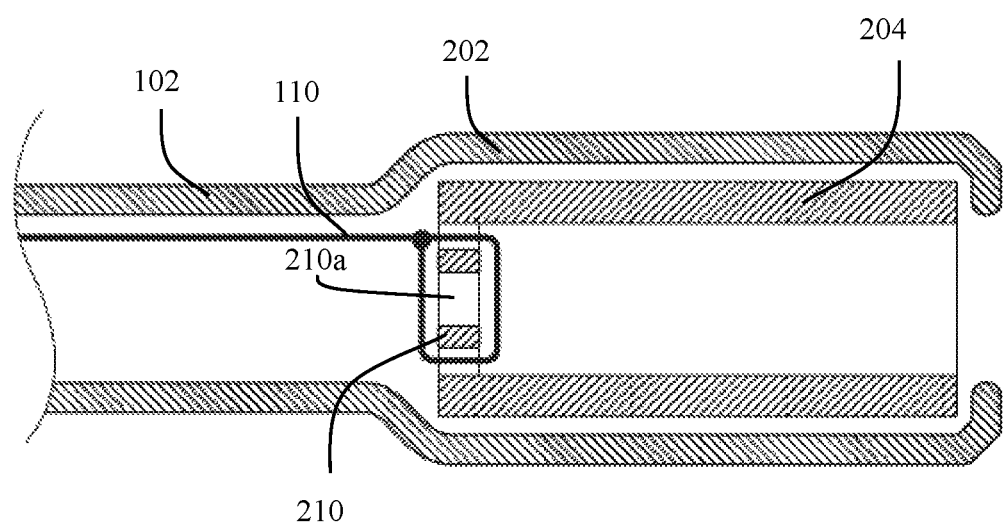

Referring to FIGS. 3M and 3N, in some embodiments, the tether 110 can be looped through the anchoring disc 210 can coupled to itself, for example, as discussed with respect to FIG. 3D. The anchoring disc 210 designs discussed with respect to FIGS. 3M and 3N can be similar to the designs discussed with respect to FIGS. 3K and 3L, respectively, with a tether 110 design similar to that discussed with respect to FIG. 3D. For example, the distal end of the tether 110 can be inserted into a first opening in the anchoring disc 210, looped around, the out a second opening in the anchoring disc 210. Thereafter, the tether 110 can be coupled to itself near the anchoring disc 210. The tether 110 may be coupled to itself using any combination of methods, for example, via welding, wire forming, crimped, etc. In this implementation, the distal end of the tether 110 can terminate within the housing 202, however, the design of FIGS. 3M and 3N can be used at any point of the device 100 by having the distal end of the tether 110 terminating at any point between the proximal or distal end of the device 100.

As would be appreciated by one skilled in the art, the anchoring disc 210 can be designed as any combination of a separate component(s) from the stiffening sleeve 204, or as part of the structure of the stiffening sleeve 204, located at the end of the stiffening sleeve 204, and/or positioning within the stiffening sleeve 204. Regardless of the design, in some embodiments, the anchoring disc 210 can also include a centralized hole 210a for enabling fluid communication between the channel of the tubular member 102 and the cavity of the procedural housing 202. Similarly, the device 100 of the present disclosure can implement any combination of features discussed with respect to FIGS. 3A-3N.

Figure 4A:
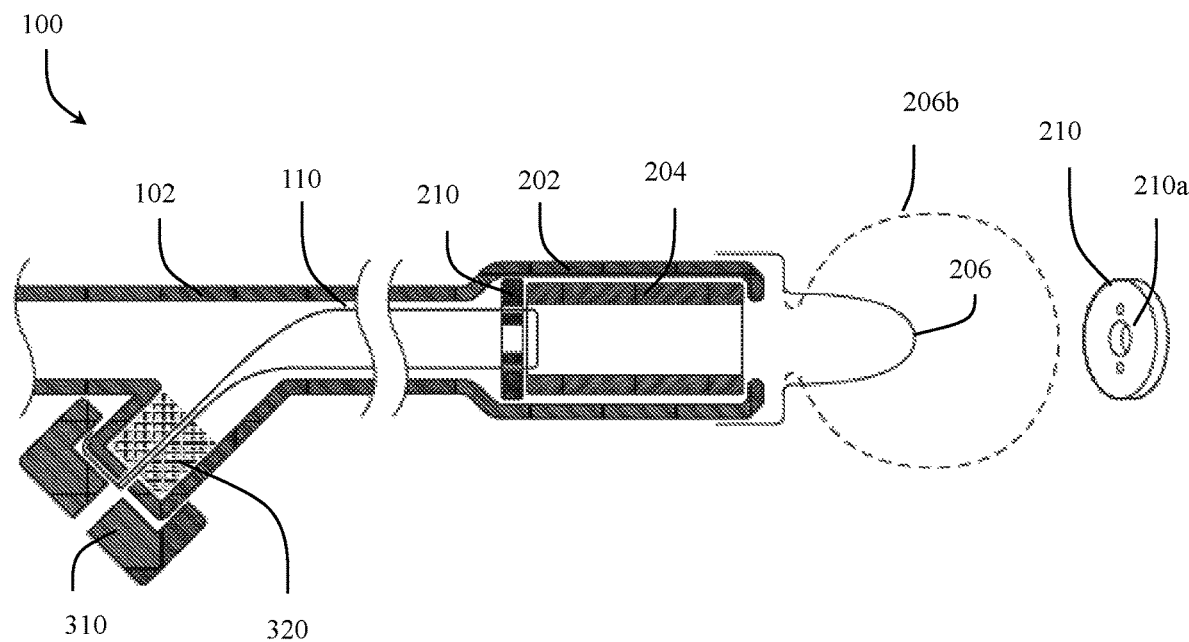
FIGS. 4A and 4B are exemplary cross-sectional views of a catheter device in accordance with the present invention.
Figure 4B:
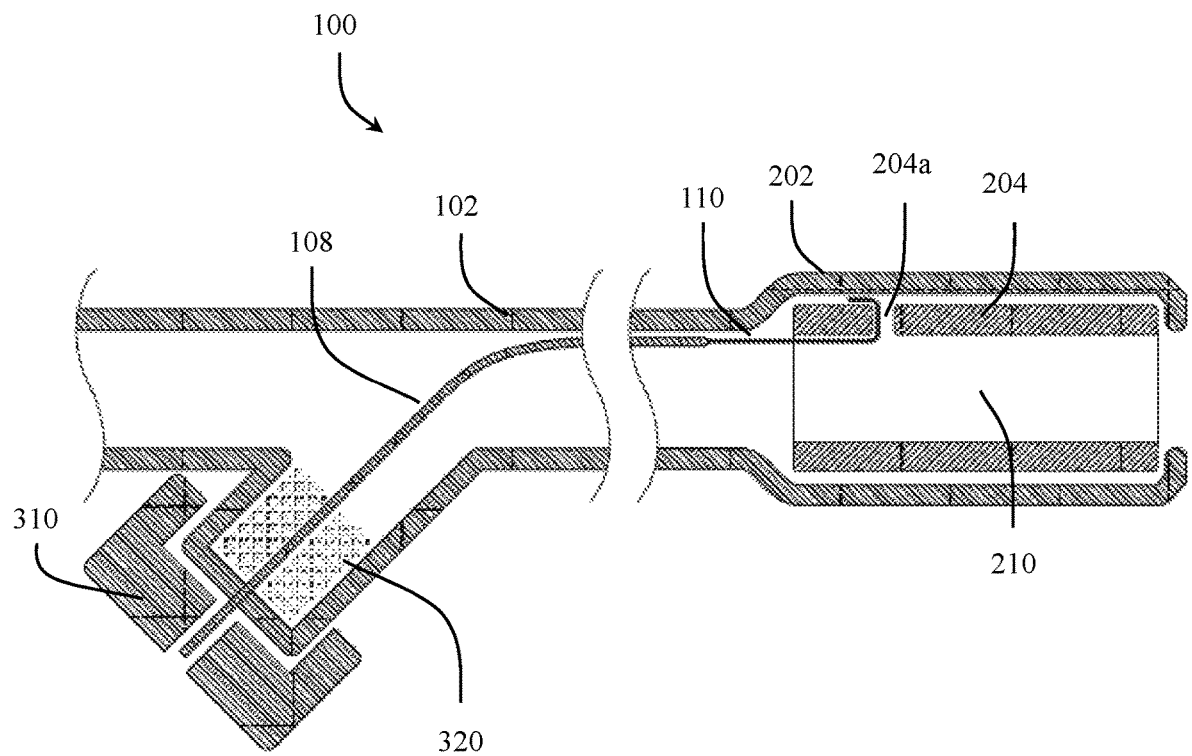

Referring to FIG. 4A, in some embodiments, both ends of the tether 110 can be coupled to the connection 300 end of the device 100 while maintaining a continuous structure between the connection 300 and the procedural tool 200. FIG. 4A depicts an example embodiment of the device 100 implementing the use of a tether 110 looped through an anchoring disc 210 located at a proximal end of the sleeve 204 with both ends of the tether 110 anchored at the connection 300 end of the device 100. The tether 110 design shown in FIG. 4A, can be similar to the tether 110 discussed with respect to FIG. 3K. In some embodiments, the device 100 can include a working end 206 that can transition between states 206b upon fluid pressurization (e.g., via gas, liquid, other fluids, etc.) transmitted via the tubular member 102. The tether 110 can include any combination of sizes and shapes that do not inhibit the flow of fluid (e.g., gas, liquid, etc.) through the tubular member 102 and/or to the procedural tool 200. As would be appreciated by one skilled in the art, the tether 110 and stylet 108 can be designed to have both ends coupled to the procedural tool 200 instead of the connector 300. For example, the tether can be looped through at the connector 300 using any combination of coupling designs discussed with respect to the procedural tool 200.

Referring to FIG. 4B, in some embodiments, one end of the tether 110 can be coupled to the procedural tool 200 end of the device 100 while maintaining a continuous structure between the connection 300 and the procedural tool 200. FIG. 4B depicts an example embodiment of the device 100 implementing the use of a tether 110 looped through an opening 204a within the sleeve 204 with the distal end of the tether 110 anchored at the sleeve 204. The tether 110 design shown in FIG. 4B, can be similar to the tether 110 discussed with respect to some combination of FIGS. 3A, 3B, 3D, 3H, and 3I. In some embodiments, the tether 110 can be integral to or coupled at its proximal end to a distal end of stylet 108 which is then coupled to the connector 300. The combination of the tether 110 and the stylet 108 can form a continuous structure between the connection 300 and the procedural tool 200. Such a continuous structure can have a variable stiffness along its length allowing for variable stiffness along the device 100 length (due to the varied thickness and properties of the stylet 108 and the tether 110) and reduced elongation due to stretch. In other words, as depicted in FIG. 4B, the tether 110 and the stylet 108 are contiguous with longitudinally variable diameter/cross-sectional shape to achieve a desired stiffness profile along the length. The proximal end of the stylet 108 can be coupled to the connector 300 to create the continuous point of tension from the connector 300 to the procedural tool 200 of the device 100. Fixation of the stylet 108 as well as the tether 110 may be achieved using a mechanical interface, adhesive, or other bonding means. Having a separate stylet 108 and tether 110 components might also provide a more cost-effective solution as individually they are commodity parts.

Continuing with respect to FIGS. 4A-4B, in some embodiments, the connector can include an adhesive element 320 to bond the tether 110 and/or the stylet 108 to the connector 300. Generally, in some instances, a larger component like a stylet 108 can be bonded with adhesive fairly well while smaller, more flexible component like the tether 110 might have difficulty being secured via adhesive. Similarly, in some instances, the stylet 108 may be too large/stiff to wrap around and be mechanically held in place by a cap 310 the same way as the tether 110. Thus, a combination of an adhesive element 320 and other elements can be sued to couple a combination of the tether 110 and the stylet 108 to the connector 300. For example, as discussed in greater detail with respect to FIG. 5A, both an adhesive element 320 (for the stylet 108) and mechanical compression to retain the tether 110 can be used.

As would be appreciated by one skilled in the art, the tether 110 can also be run substantially parallel with the stylet 108 within the tubular member 102 and with both the tether 110 and stylet 108 coupled to the connector 300 and the procedural tool 200. The tether 110 and the stylet 108 can be coupled together or separated within the tubular member 102. Similarly, the device 100 can be configured without the stylet 108 and merely utilize the tether 110 to provide flexibility and restrict stretching of the tubular member 102. As would be appreciated by one skilled in the art, the proximal section 200 of the device 100 can include any combination of couplings, for example, those discussed with respect to FIGS. 3A-3N.

Figure 5A:
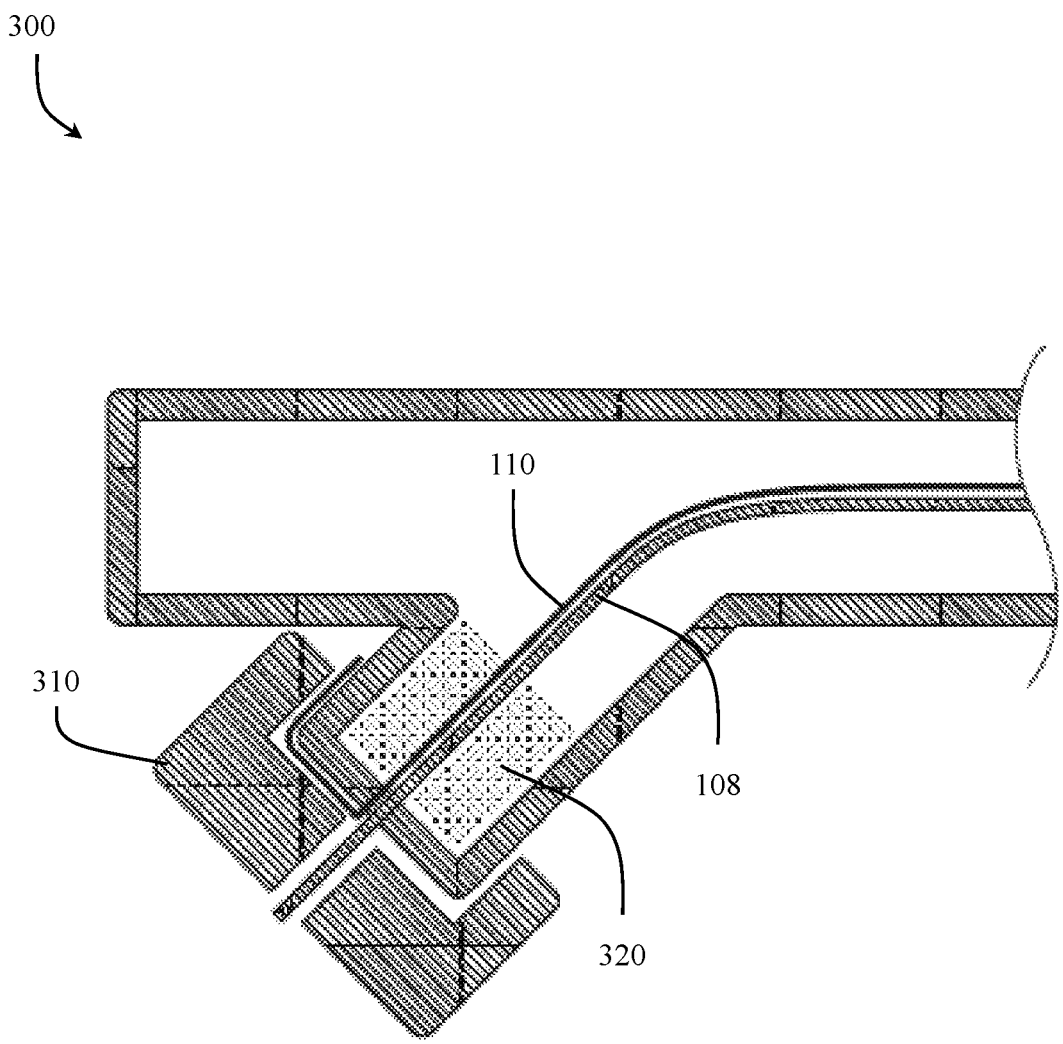
FIGS. 5A, 5B, and 5C are exemplary cross-sectional views of a tether coupled to a proximal end of the catheter device in accordance with the present invention.
Figure 5B:
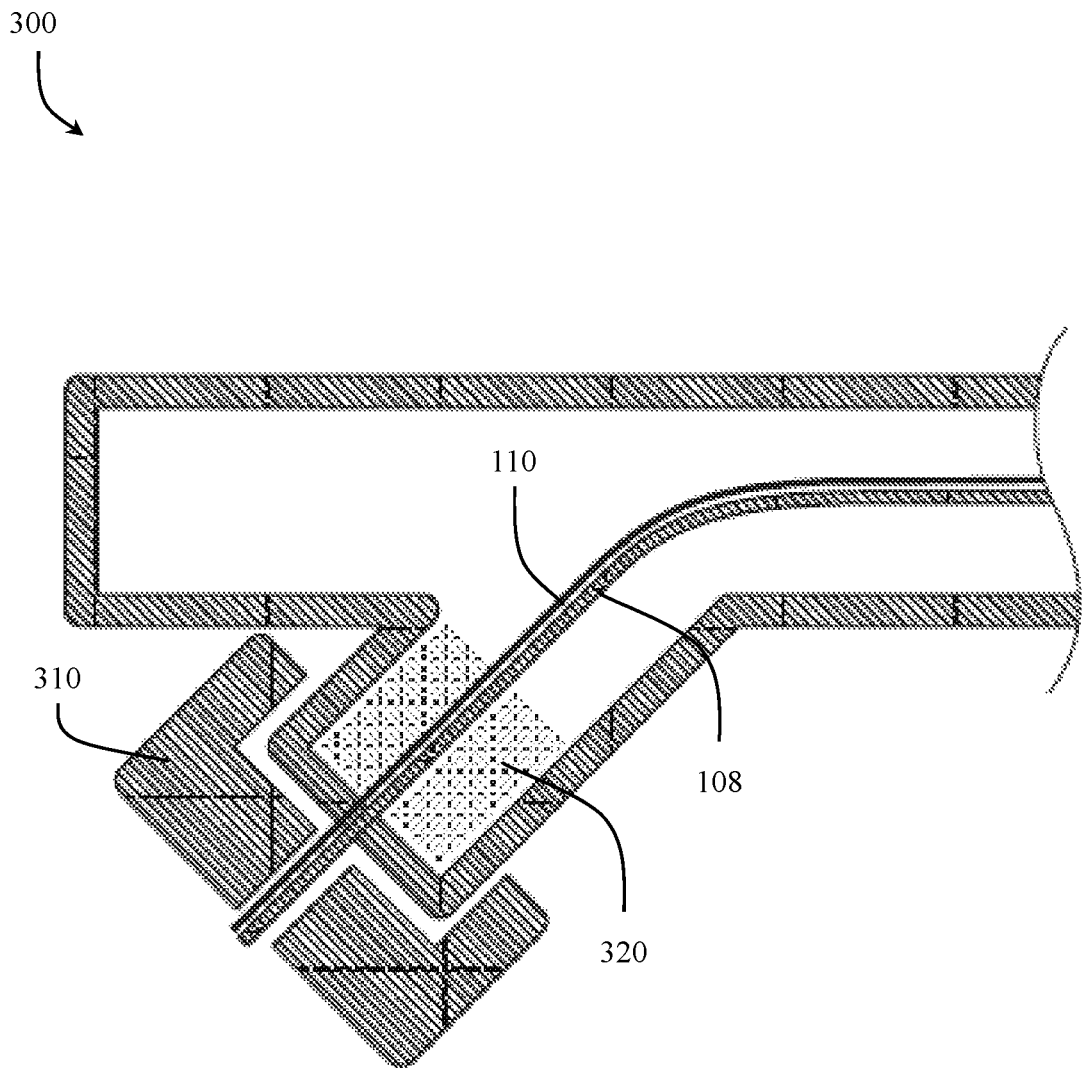
Figure 5C:
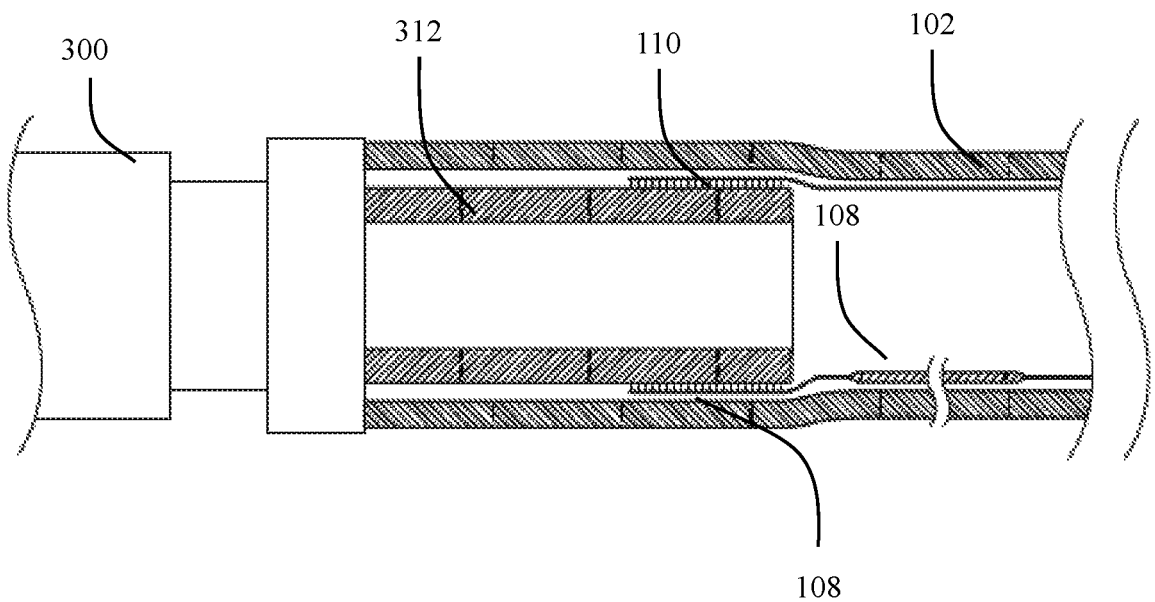

Referring to FIGS. 5A-5C, in some embodiments, at least one end of the tether 110 (not coupled to the stiffening sleeve 204) can be coupled to the proximal end of the device 100 at the connector 300 (e.g., a Y-connector). FIGS. 5A-5C show example cross-section views of examples for coupling one or both ends of the tether 110 and the stylet 108 to the connector 300.

Referring to FIG. 5A, in some embodiments, at least one end of the tether 110 (not coupled to the stiffening sleeve 204) and at least one end of a stylet 108 can be coupled to the connector 300 of the device 100. As depicted in FIG. 5A, at least one end for both the tether 110 and the stylet 108 can be coupled to the connector 300 of the device 100. In some embodiments, the tether 110 and the stylet 108 can be coupled in the different manners. For example, as depicted in FIG. 5A, the stylet 108 can be partially anchored in an adhesive element 320 within the connector 300 and pulled through an end of the connector 300 (e.g., an end of the Y-connector) into a cap 310 while the tether 110 can be pulled through a vent hole in the cap 310 and wrapped around an exterior end of the connector 300. The adhesive element 320 can prevent air egress through the vent hole in the cap 310 which the stylet 108 passes through.

In some embodiments, the cap 310 can be coupled to the end of the connector 300, for example via a friction fit, screw on fit, adhesive, bonding, welding, etc., to hold the end of the tether 110 in place. The stylet 108 can be pulled through an opening in the cap 310. In this example, the tether 110 and the stylet 108 can be coupled to one branch of the connector 300 (e.g., Y-connector), but as would be appreciated by one skilled in the art, the tether 110 and the stylet 108 can be coupled to an end of another style connector, such as for example, a T-connector, without departing from the scope of the present invention.

Referring to FIG. 5B, in some embodiments, at least one end of the tether 110 and at least one end of the stylet 108 can be coupled to the connector 300 of the device 100 in the same manner. For example, as depicted in FIG. 5B, both the stylet 108 and the tether 110 can be pulled through an end of the connector 300 (e.g., an end of the Y-connector) into and/or out of a cap 310. In this example, the tether 110 and the stylet 108 can be coupled to one branch of the connector 300 (e.g., the Y-connector), but as would be appreciated by one skilled in the art, the tether 110 and the stylet 108 can be coupled to any part of the connector 300 and any style of connector, such as for example, a T-connector, without departing from the scope of the present invention. In some embodiments, when a combination of stylet 108 and tether 110 are pulled through the end of the connector 300, the tension on either the stylet 108 and/or tether 110 can be manually adjusted, for example, by pulling on an end of the stylet 108 and/or tether 110.

Referring to FIG. 5C, in some embodiments, at least one end of the tether 110 (not coupled to the stiffening sleeve 204) and/or at least one end of the stylet 108 can be coupled to and intermediary point within the device 100. For example, some combination of the tether 110 and the stylet 108 can be bonded/welded to an axially aligned intermediary member 312 that is located concentric to the channel of the tubular member 102. The tether 110 and stylet 108 can be bonded together or separately onto the axially aligned intermediary member 312 using various methods such as adhesives, welding, thermal bonding, crimping, etc. Using a design including the intermediary member 312 enables flexibility in the design of the connector 300 of the device, such that for example, a Y-connector does not need to be used. In some embodiments, one of the tether 110 and the stylet 108 is coupled to the intermediary member 312 while the other is coupled to the connector 300. In some embodiments, the coupling of ends of the tether 110 and the stylet 108 can be provided using any combination. For example, both ends of the tether 110 can be coupled to separate stylets 108 which are both coupled to the connector 300.

The tether 110 and/or stylet 108 can be configured in any means that provides a continuous non-elongate structure held in tension between the connector 300 and the procedural tool 200 of the device 100 and is not intended to be limited to the examples provided herein. For example, the tether 110 can be manually held in tension by a user at the connector 300 by holding the proximal end of the tether 110 protruding from the connector 300. In another example, the tether 110 can be fixedly attached to the connector 300 but removably attached to the procedural tool 200 (e.g., via a mechanical coupling mechanism). As such, the tether 110 can be fixedly coupled to both the connector 300 and the procedural tool 200, fixedly attached to one of the connector 300 and the procedural tool 200 (while removably attached to the opposing end), or removably attached to both the connector 300 and the procedural tool 200.

Referring to FIGS. 6A-6G, in some embodiments, the connector 300 can include an indicator membrane 226 within a separate component housing 228 coupled to the connector 300. The combination of the separate component housing 228 and the indicator membrane 226 can be utilized to provide visual and/or tactile feedback to a user regarding a state of the component on the working end 206 of the procedural tool 200 of the device 100. In some embodiments, the indicator membrane 226 can transition to multiple states that reflect a state of the procedural tool 200. FIGS. 6A-6G depict various designs for the indicator membrane 226.

Referring to FIGS. 6A-6E, in some embodiments, the indicator membrane 226 can be sealed in a housing 228 comprised of two or more metallic, polymeric, thermoplastic, or similar components. The housing components can be closed and bonded around the indicator membrane 226 creating an airtight seal that can be open to atmospheric pressure on one side (exterior side) and to the catheter interior pressure on the other side (interior side). The two housing 228 components may have substantially different inner diameters or differently shaped channels such that a bulge can be created by the distended indicator membrane 226, which can be visually and tacitly indicative of the working end 206 state to the user.

Referring to FIG. 6A, an example cross-sectional view of the indicator membrane 226 within the separate component housing 228 is depicted. As depicted in FIG. 6A, the housing 228 can be fitted within the connector 300 of the device via a friction fit. Alternatively, the housing 228 can be fixedly attached to the device 100, for example, through adhesive, a mechanical connection, or an extension of the connector 300 itself. In some embodiments, the separate component housing 228 is in fluid communication with the tubular member 102 such that the pressure present in the tubular member 102 will be substantially equal the pressure realized at the separate component housing 228. The relationship of the separate component housing 228 along with the indicator membrane 226 can be designed to provide visual indication reflective of the pressure present in the tubular member 102.

Referring to FIG. 6B a perspective view of the housing 228 with the indicator membrane 226 reflecting a positive state is depicted. In some embodiments, a positive state can be visually and tactically reflected by the membrane 226 being distended outward from the housing 228. The positive state can reflect the pressure within the tubular member 102 when a positive pressure is being applied (e.g., via the connector 300). Referring to FIG. 6C a perspective view of the housing 228 with the indicator membrane 226 reflecting a negative state is depicted. In some embodiments, a negative state can be visually and tactically reflected by the membrane 226 being distended inward into the housing 228. The negative state can reflect the pressure within the tubular member 102 when a negative pressure is being applied (e.g., via the connector 300).

Referring to FIG. 6D a cross-sectional view of the housing 228 with the indicator membrane 226 reflecting a positive state is depicted. Referring to FIG. 6E a cross-sectional view of the housing 228 with the indicator membrane 226 reflecting a negative state is depicted.

Figure 6F:
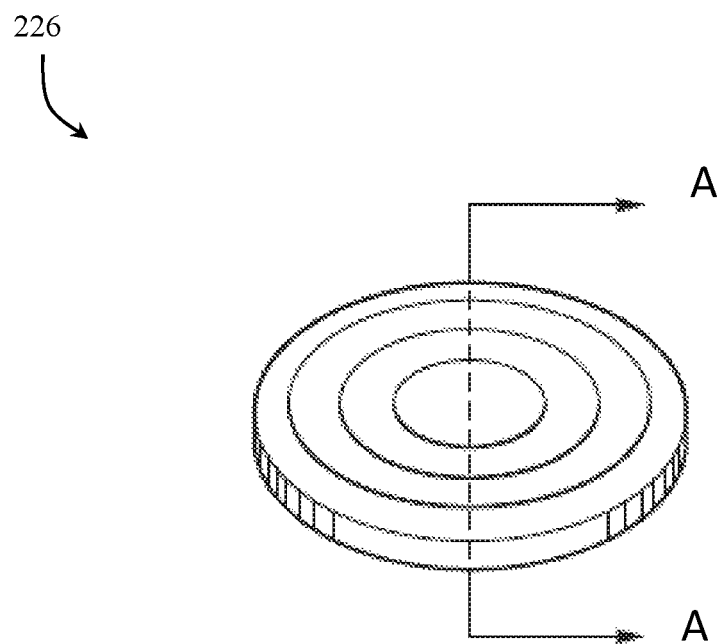
Figure 6G:
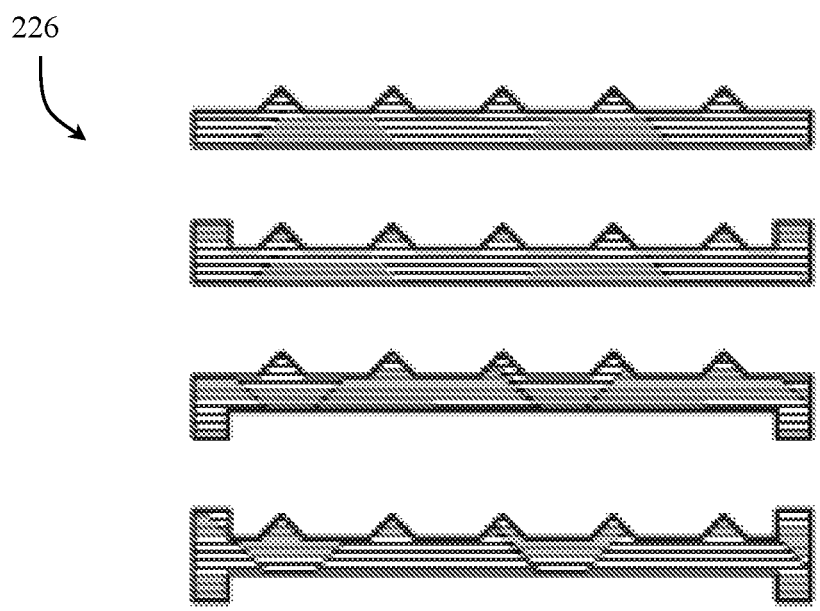

Referring to FIGS. 6F and 6G, in some embodiments, the membrane 226 can include textures that further provide visual and/or tactile feedback as to the state of pressure within the device 100. For example, the membrane 226 can include a number of raised or recessed ridges, depressions, etc. that extenuate when the membrane 226 is collapsed or distended out. The textural features on the indicator membrane 226 can enhance the ability of the user to visually or tacitly discern the status of the balloon. FIG. 6F depicts an isometric view of an example membrane 226 with a textured surface for providing tactile and/or visual feedback. FIG. 6G depicts a cross-sectional view 'A' of an example membrane 226 with different textured surfaces for providing tactile feedback to a user. Additionally, the indicator membrane 226 may have a variable cross-sectional thickness to improve the seal to the housing components. The variable cross-sectional thickness may also be designed to encourage preferential deflection towards one side or the other.

Referring to FIGS. 7A-7C, representative examples of the operational states of indicator membrane 226 is depicted. Referring to FIG. 7A, a neutral state of the indicator membrane 226 is provided. In some embodiments, the indicator membrane 226 is in a neutral (non-stretched, non-deflected) position when not under a pressure load from the connector 300. Referring to FIG. 7B, the indicator membrane 226 deflected in an upward direction under positive pressure is provided. Referring to FIG. 7B, the indicator membrane 226 deflected in a downward direction under negative pressure is provided. Positive pressure can be created by the application of fluid (e.g., gas, liquid, etc.) into the continuous channel shared by the membrane 226, the tubular member 102, and the procedural tool 200. Similarly, negative pressure can be created by the withdrawal of fluid from the continuous channel (or application of a vacuum) shared by the membrane 226, the tubular member 102, and the procedural tool 200.

In some embodiments, the indicator membrane 226 can enable a user to visually and/or tactile determine the state of the procedural tool at the procedural tool 200 within the patient. For example, the indicator membrane 226 can indicate negative pressurization, neutral, or positive pressurization condition of the distal working end 206 for a catheter device. In some embodiments, the indicator membrane 226 can be configured to indicate three main states and two transitional states for the procedural tool on the procedural tool 200 of the device 100. For example, the indicator membrane 226 can indicate a neutral state (e.g., deflated), a positive state (e.g., inflated), a negative state (e.g., inverted) as main states and the transitions between the neutral state and positive state and the neutral state and the negative state as transitional states. As would be appreciated by one skilled in the art, the indicator membrane 226 can include any material and shape that is configured to change shape under positive or negative pressure, such as for example, a membrane or a balloon. The indicator membrane 226 may be made of an elastomeric material in a range of thicknesses, durometers or surface areas. The combined thickness, durometer and surface area properties may be designed to deflect a certain distance for a specific pressure load introduced from the connector 300 (e.g., via a syringe). The indicator membrane 226 can provide a visual and/or tactile indicator for a user, without the aid of imaging devices, for the user to determine the state of the procedural tool (e.g., working end 206) located on the procedural tool 200 of the device 100, while it is inside the patient and out of view to the user.

Figure 8A:
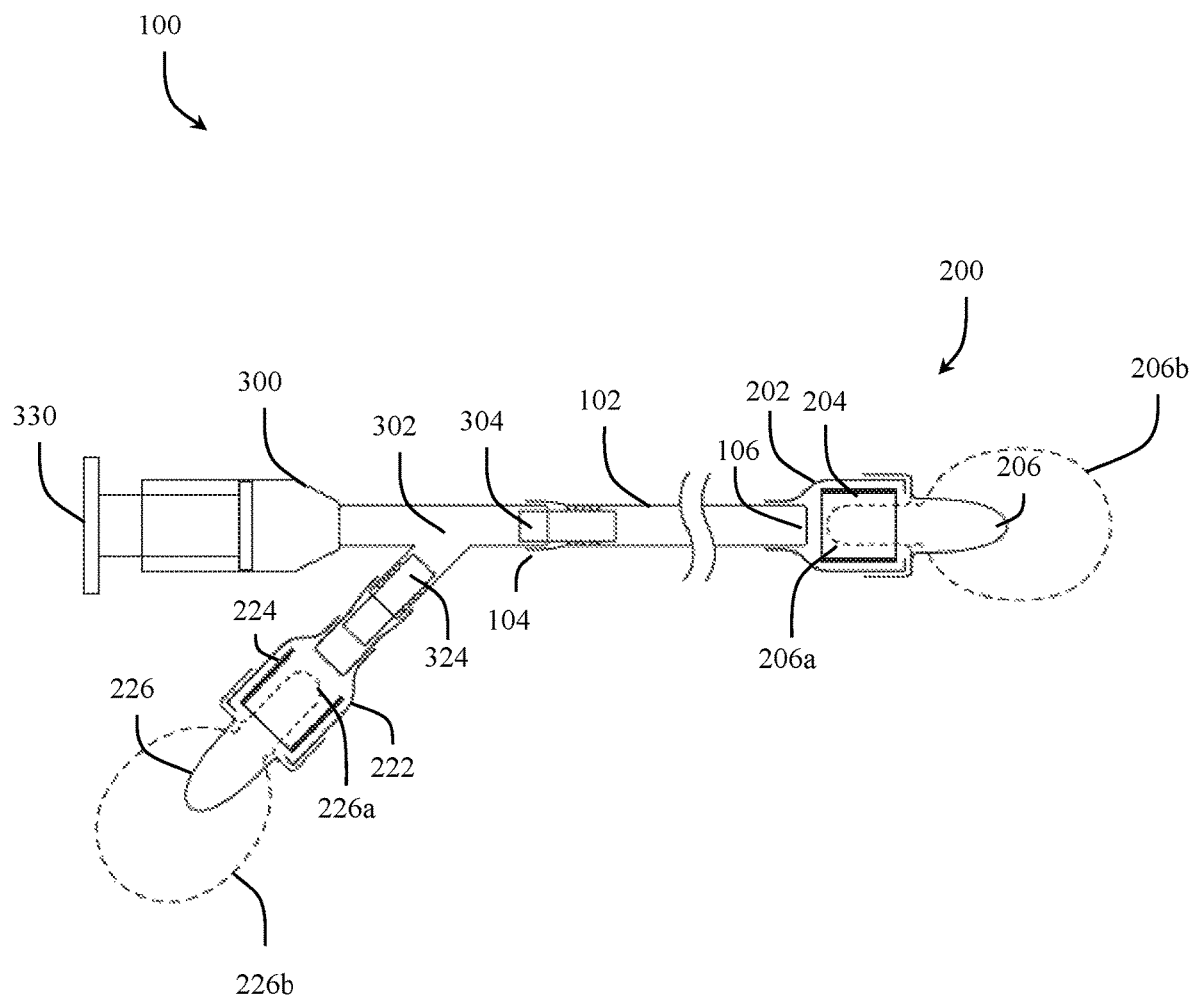
FIGS. 8A, 8B, and 8C are exemplary cross-sectional views of a catheter device in accordance with the present invention.
Figure 8B:
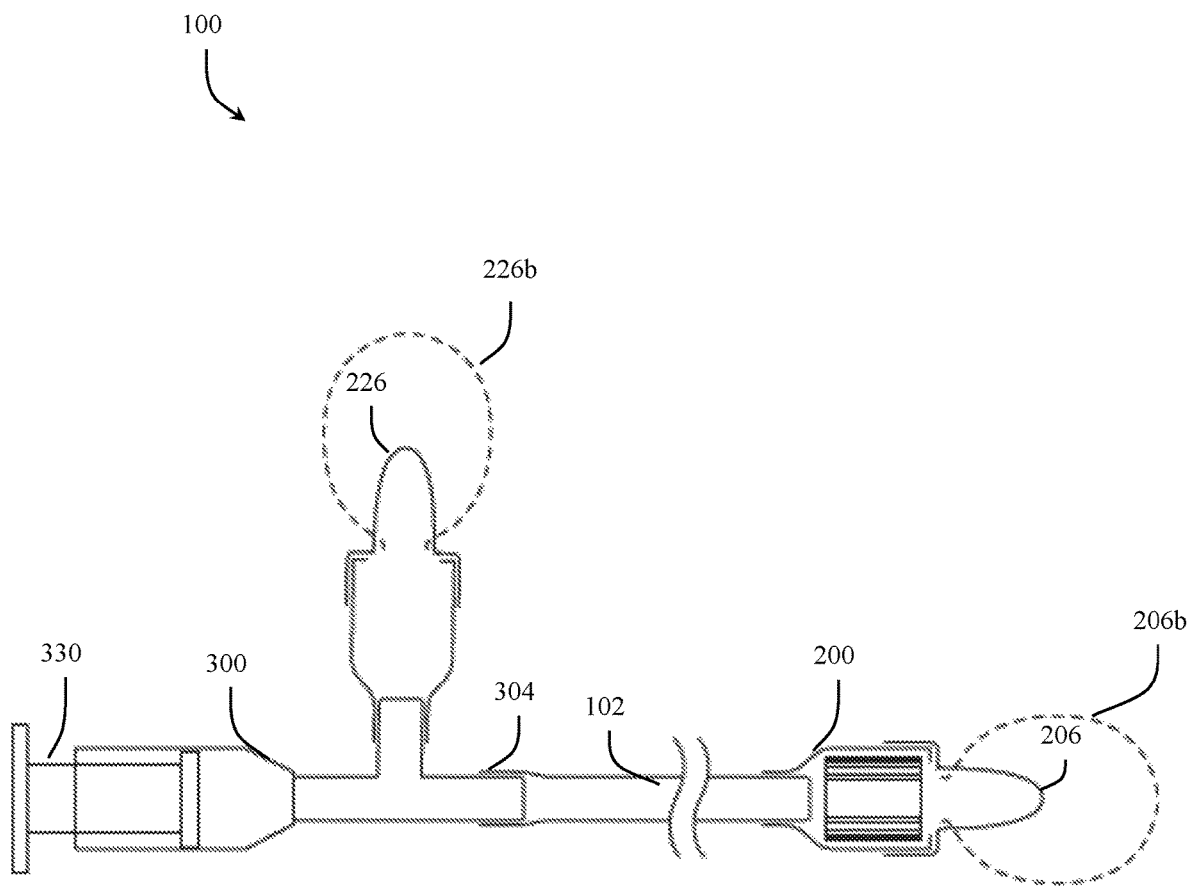
Figure 8C:
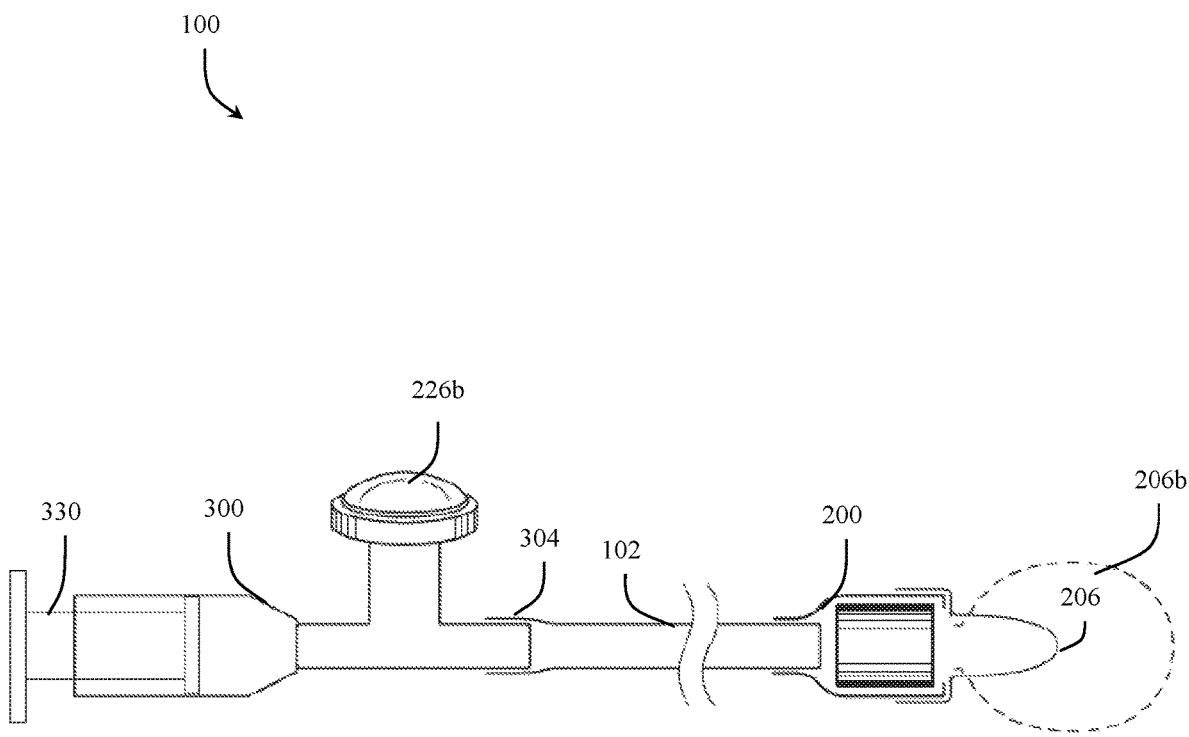
Figure 9A:
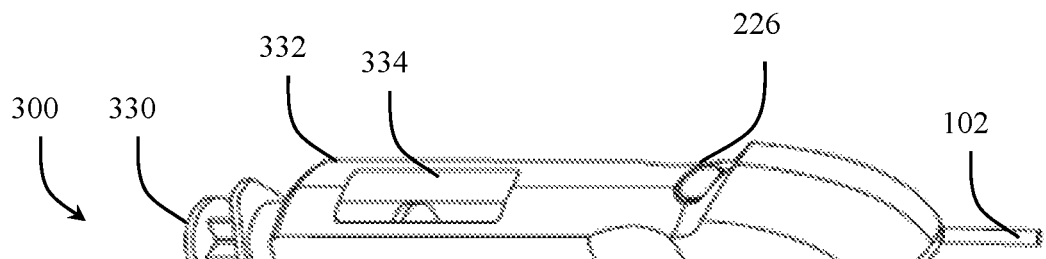
FIGS. 9A, 9B, 9C, 9D, and 9E are exemplary perspective views of a handle for the catheter device in accordance with the present invention, incorporating window(s) or cut-away(s) to enable direct visualization of a syringe attached to the catheter device and markings or indicators to delineate ideal positioning of the syringe plunger.
Figure 9B:
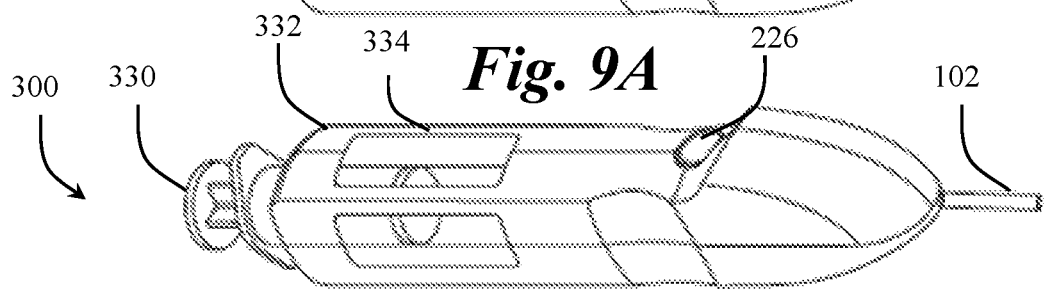
Figure 9C:
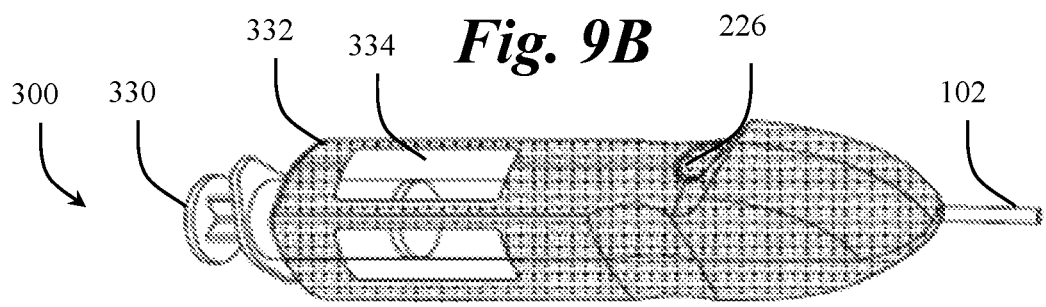
Figure 9D:
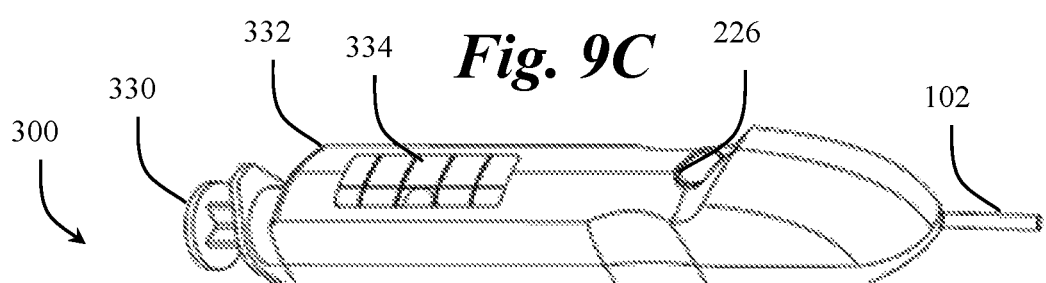
Figure 9E:
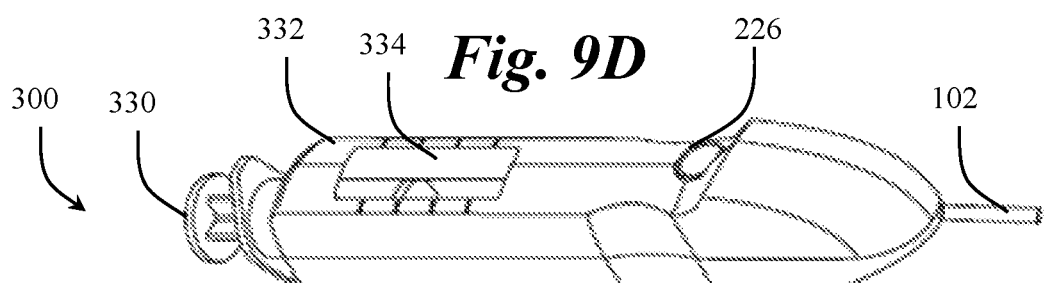

Referring to FIGS. 8A-8C, in some embodiments, the construction of the indicator membrane 226 and its housing can be the same construction as the housing 202 and working end 206 of the device 100. Similar to the working end 206, the indicator membrane 226 can be coupled to a housing 222 including a stiffening sleeve 224 and can be pressurized and depressurized (e.g., inflated and deflated) from within the housing 222 based on a pressurization applied through the connector 300 in the same manner as the working end 206 as discussed in greater detail with respect to FIGS. 1-4B.

As depicted in FIGS. 8A-8C, the indicator membrane 226 can be configured to operate in the same manner as the working end 206 but can be situated at the connector 300 of the device 100 rather than the distal end of the tubular member 102. In other words, during operation, the indicator membrane 226 can be located outside a patient while the working end is located inside the patient 206. With this design, the indicator membrane 226 can substantially mirror the size, shape, and state of the working end 206. For example, in a positive pressure state, both the indicator membrane 226 can be in a state 226*a* (retracted) and the working end can be in a state 206*a* (retracted). This enables a user to see and feel exactly what the working end 206 is doing without being able to see the working end 206 itself.

In some embodiments, the housing 222 can be bonded to the tubular member 102 via the connector 300, such as for example, a Y-connector (FIG. 8A), a T-connector (FIG. 8B or 8C), or via a piece of flexible tubing. For example, the housing 222 can be coupled to the connector 300 via a fitting 324 or other coupling mechanism, as depicted in FIG. 8A. As depicted in FIG. 8A, the channel providing the indicator membrane 226 is part of the Y-connector, however, any connector can be utilized that provided a fluid communication channel to both balloons 206, 226. Referring to FIGS. 8B and 8C, in some embodiments, a T-connector can be utilized to implement the indicator membrane 226. Regardless of configuration, all the designs can be configured so as to indicate the pressure differential between the tubular member 102 and atmosphere. In one example implementation, the mirrored pressurization/state of the working end 206 and indicator membrane 226 can be compliant or dilatation balloons (or a longitudinally moveable member) in fluid communication with the same channel within the device 100, which is providing said pressurization.

In some embodiments, the connector 300 can be designed to receive a syringe 330 that can provide fluid (e.g., liquid, gas, etc.) to an input of the connector 300. The syringe can provide fluid into an open channel of the device to provide equal pressurization to both the working end 206 via the tubular member 102 and the indicator membrane 226 via the channel within the connector 300.

Referring to FIG. 8C, in some embodiments, the indicator membrane 226 can have a different design than that of the working end 206, for example, using a design similar to the designs discussed with respect to FIGS. 6A-6G. Additionally, the indicator membrane 226 can be part of the overall structure of the device 100 or a separate component configured to couple with the device 100 (e.g., via an opening), as depicted in FIG. 6A.

Referring to FIGS. 9A-9E, in some embodiments, the indicator membrane 226 and/or housing 228 encasing the indicator membrane 226, can be housed within a handle 332 construction surrounding at least a portion of the connector 300 of the device 100. The handle 332 can be designed in such a way so as to form an ergonomic shape for the user to hold, while concealing and protecting the internal members of the functional assembly (fittings, tubes, bonds, etc.) of the connector 300 of the device 100. The handle 332 can be constructed from any combination of materials for any combination of shapes. For example, the handle 332 can be formed from a single piece (e.g., printed, molded, cast, etc.) or can have one or more pieces designed to mate together to form the handle 332. In some embodiments, the indicator membrane 226 and/or membrane 226 subassembly can be securely held in place by the one or more pieces of the handle 332 (e.g., two or more housing pieces to compress and seal around the indicator membrane 226). In some embodiments, the shape of the handle 332 and positioning of the indicator membrane 226 can be configured to a shroud to hide the indicator membrane 226 from the visual field of the patient while still enabling visual/tactile access to the user.

Continuing with FIGS. 9A-9E, in some embodiments, the handle 332 can include a viewing window 334 to show a positioning (e.g., barrel or plunger) of the syringe 330 during use. The viewing window 334 can be provided in a number of manners, materials, and with a number of configurations. For example, the viewing window 334 can be a cut out within the handle 332 housing and/or it can have clear or opaque material over the cutout to see the syringe. Similarly, the housing 332 itself can be designed to provide the viewing window 334. For example, the housing 332 can be opaque except at the location of the viewing window 334. In some embodiments, the viewing window 334 can include markings or other indicators to show the user the position/state of the syringe. For example, the viewing window 334 can include line marks, color coded marks, numbering, it can be frosted or textured in other areas to obscure visual access to internal members. The markings can provide visual indicators to correlate the proper axial placement of the syringe plunger to the appropriate volume (e.g., pressure) for a given procedural step. For example, the markings can indicate to a user how far to push the syringe 330 to apply a particular positive pressure and/or how far to back up the syringe 330 to apply a negative pressure.

Figure 10A:
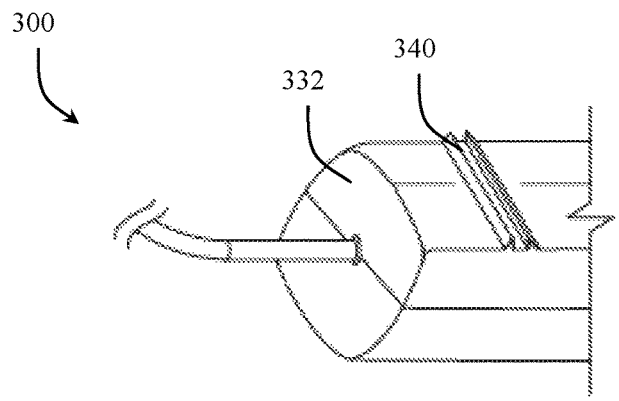
FIGS. 10A and 10B are exemplary illustrative side and top views of a catheter device in accordance with the present invention.
Figure 10B:
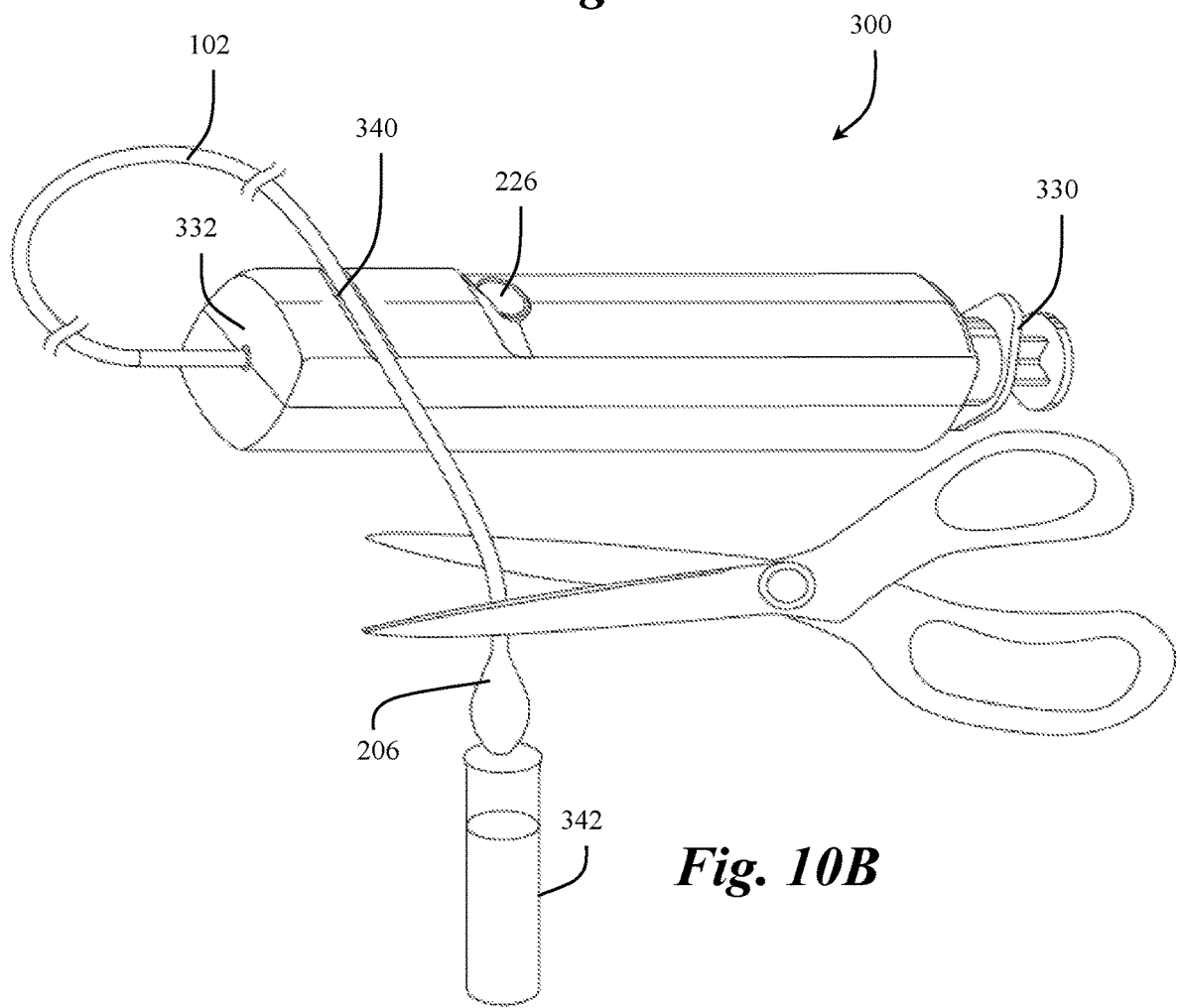

Referring to FIGS. 10A and 10B, in some embodiments, the handle 332 can include a fastener 340 designed to receive and hold the tubular member 102 in place. The fastener 340 can include any combination of sizes, shapes and designs for holding the tubular member 102 in place. For example, the fastener 340 can be a shaped recess within the housing 332, a series of protrusions extending from the housing 332, one or more clips or other types of fasteners, or a combination thereof. The fastener 340 can be positioned along any combination of locations on the housing. For example, the housing 332 can include a fastener 340 near the proximal end of the housing such that the tubular member 102 can be positioned over the housing 332 and into the fastener 340, as shown in FIG. 10B. In some embodiments, the fastener 340 can hold the tubular member in place so that the procedural tool 200 can be removed from the distal end of the tubular member 102, for example, by cutting at least a portion of the distal portion of the tubular member off.

In operation, the catheter device 100 as discussed with respect to FIGS. 1-10B, can be used for any combination of procedures. For example, the catheter device 100 can be used for any combination of processes in which a tube is inserted within a lumen (e.g., a body lumen, a pipe, a conduit, etc.) for a particular purpose. In some embodiments, the process can include providing a catheter device for insertion into a lumen, the catheter device 100 having the tubular member 102 with a channel extending from a proximal end to a distal end and a continuous non-elastic structure (or tether 110), situated within the channel of the tubular member. The continuous non-elastic structure can be configured to alter the mechanical behavior of the tubular member 102, for example, substantially eliminating elongated expansion of the tubular member 102 (e.g., during removal). The process can also include steps for inserting the tubular member 102 and the procedural tool 200 into the lumen. For example, the tubular member 102 and procedural tool 200 can be inserted into a body lumen of a patient through swallowing or intubation.

The process can further include performing a procedure by pressurizing or depressurizing the tubular member 102 to activate and/or deactivate the procedural tool 200. As discussed herein, the pressurizing or depressurizing can be performed by inserting or removing fluid from within the device 100, for example, using a syringe. The pressurizing or depressurizing of the tubular member 102 can be provided to cause the procedural tool 200 to change states, for example, expand, retract, etc. a dilation balloon 206 to different states 206a, 206b. For example, when a positive pressure is supplied to an input of the connector 300 (e.g., via syringe 330) then the working end 206 will be pressurized to activate a first state (e.g., inflate) from their respective end structures 202, 222. Similarly, as a negative pressure (e.g., a vacuum) can be applied to an input of the connector 300, the working end 206 and 226 will be depressurized and/or in a vacuum to activate a second state (e.g., deflate) at their respective end structures 202, 222. In an optional step, the process can include visually and/or tactically confirming a state of the procedural tool by viewing and/or touching an indicator membrane 226 located on the device 100. The indicator membrane 226 can be in fluid communication with the same channel as the procedural tool 200 such that the state of the indicator membrane 226 reflects the state of the procedural tool 200.

The procedural tool 200 can be used for any combination of purposes, for example, anchoring, cell collection, expanding an area, traversing an obstacle, etc. Once the desired procedure is complete, the tubular member 102 and procedural tool 200 can be removed from the lumen. During removal of the tubular member 102 from the lumen, the continuous non-elastic structure within the tubular member can substantially limits elongation of the tubular member 102 during removal. Once the procedure is complete and the device 100 has been removed, the procedural tool 200 can optionally be removed from the device 100. For example, the tubular member 102 can be inserted into a fastener 340 on the device 100 to allow a user hands free access to cut or otherwise remove (e.g., unscrew, decouple, etc.) the procedural tool 200 from the device 100, as depicted in FIG. 10B. Thereafter, the procedural tool 200 can be disposed of or stored for future use/analysis. For example, the procedural tool 200 can be stored within a vial for further analysis.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A device comprising:
   a flexible tubular member having a proximal end, a distal end, and channel extending substantially between the proximal end and the distal end;
   a stiffening sleeve positioned at the distal end of the tubular member to provide stiffness thereto so that a removable procedural tool can be attached to the tubular member;
   an elongated non-elastic tether situated within the channel of the tubular member and—fixed at its distal end to a point about a distal portion of the tubular member, such that the tether can be held in tension to minimize axial stretching of the tubular member to prevent the tubular member from axially springing back to a neutral state, during use;
   a connector arranged at the proximal end of the flexible tubular member, wherein the connector is at least one of a Y-connector and a T-connector; and
   an indicator membrane on the connector configured to provide tactile feedback to reflect positive or negative pressure being applied to the tubular member;
   wherein the elongated non-elastic tether is directly coupled to the connector.

2. The device of claim 1, wherein the tubular member is a catheter.

3. The device of claim 1, wherein the tether is coupled to the proximal end and the distal end of the tubular member.

4. The device of claim 3, wherein the tether is fixedly coupled to the proximal end.

5. The device of claim 3, wherein the tether is removably coupled to the proximal end.

6. The device of claim 3, wherein the tether is fixedly coupled to the distal end.

7. The device of claim 3, wherein the tether is removably coupled to the distal end.

8. The device of claim 1, wherein the tether is coupled to the procedural tool and extends through at least a portion of the tubular member.

9. The device of claim 1, wherein the procedural tool is at least one of a compliant balloon or a longitudinally moveable member.

10. The device of claim 1, further comprising a syringe for adjusting a pressurization through the tubular member.

11. The device of claim 10, further comprising a handle encasing the connector and having a viewing window showing a position of the syringe.

12. The device of claim 1, further comprising a housing having a fastener for receiving and holding the tubular member.

13. The device of claim 12, further comprising a fitting coupling the connector to the tubular member.

14. A system comprising:
    a flexible tubular member having a proximal end, a distal end, and channel extending substantially between the proximal end and the distal end;
    a procedural tool coupled to the distal end of the tubular member, wherein the procedural tool includes at least one anchoring disc arranged therein;
    an elongated non-elastic tether situated within the channel of the tubular member and—fixed at its distal end to a point about a distal portion of the tubular member, such that the tether can be held in tension to minimize axial stretching of the tubular member to prevent the tubular member from axially springing back to a neutral state during use, the elongated non-elastic tether coupled to the at least one anchoring disc;
    a connector coupled to the proximal end of the tubular member;
    a mechanism coupled to the connector for applying positive or negative pressure to the tubular member; and
    an indicator membrane coupled to the connector to provide tactile feedback reflecting the positive or negative pressure being applied to the tubular member.

15. The system of claim 14, wherein the tether is coupled to the proximal end and the distal end of the tubular member.

16. The system of claim 14, wherein the procedural tool is at least one of a compliant balloon or a longitudinally moveable member.

* * * * *